(12) United States Patent
Maeda et al.

(10) Patent No.: US 12,552,696 B2
(45) Date of Patent: Feb. 17, 2026

(54) ION REMOVAL SYSTEM

(71) Applicant: Panasonic Intellectual Property Management Co., Ltd., Osaka (JP)

(72) Inventors: Yasunari Maeda, Osaka (JP); Ayane Kihara, Nara (JP); Tomohiro Akita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 189 days.

(21) Appl. No.: 16/982,619

(22) PCT Filed: Feb. 6, 2019

(86) PCT No.: PCT/JP2019/004224
§ 371 (c)(1),
(2) Date: Sep. 21, 2020

(87) PCT Pub. No.: WO2019/207901
PCT Pub. Date: Oct. 31, 2019

(65) Prior Publication Data
US 2021/0024393 A1 Jan. 28, 2021

(30) Foreign Application Priority Data
Apr. 27, 2018 (JP) ................. 2018-086280

(51) Int. Cl.
*C02F 5/06* (2023.01)
*C02F 1/68* (2023.01)

(52) U.S. Cl.
CPC ............... *C02F 5/06* (2013.01); *C02F 1/687* (2013.01); *C02F 2301/04* (2013.01); *C02F 2305/00* (2013.01)

(58) Field of Classification Search
CPC ........ C02F 5/06; C02F 5/102; C02F 2301/04; C02F 2305/00; C02F 2301/046;
(Continued)

(56) References Cited

U.S. PATENT DOCUMENTS 3,865,725 A * 2/1975 Condolios .......... B01D 21/2427
209/13

FOREIGN PATENT DOCUMENTS

AU 2010357340 B2 7/2014
GB 2517597 A 2/2015
(Continued)

OTHER PUBLICATIONS

Matsumoto et al., "The Application of Micro-Bubbles for Dissolution and Crystallization of Calcium Carbonate in Gas-Liquid-Solid System", Bulletin of the Society of Sea Water Science. Japan., 2004, 58, p. 475-486 (Year: 2004).*

(Continued)

*Primary Examiner* — Magali P Slawski
*Assistant Examiner* — Bernadette Karen Mcgann
(74) *Attorney, Agent, or Firm* — Renner, Otto, Boisselle & Sklar, LLP

(57) ABSTRACT

An ion removal system includes: an ion removal device including a hard water storage configured to store hard water and a fine bubble generator configured to generate a fine bubble to supply the hard water storage with the fine bubble, for removing a metal ion from the hard water by adsorbing the metal ion in the hard water to the fines bubble in the hard water storage and crystallizing and precipitating the adsorbed metal ion; and a particle feeder configured to bring a particle containing a same element as that of the metal ion into the hard water at a feeding point, the feeding point being located upstream of the hard water storage or located in the hard water storage.

12 Claims, 14 Drawing Sheets

(58) Field of Classification Search
CPC .......... C02F 2001/5218; C02F 2101/20; C02F 1/68; C02F 1/28; C02F 1/281; C02F 1/52; C02F 1/5236; C02F 1/687; C02F 2201/002; C02F 2201/004; C02F 2201/05
See application file for complete search history.

(56) References Cited

FOREIGN PATENT DOCUMENTS

| JP | 2000-140840 A | | 5/2000 | |
|---|---|---|---|---|
| JP | 2004-16996 A | | 1/2004 | |
| JP | 2004016996 | * | 1/2004 | |
| JP | 2009-131737 A | | 6/2009 | |
| JP | 2012-81370 A | | 4/2012 | |
| JP | 2014-76421 A | | 5/2014 | |
| JP | 2014-140820 A | | 8/2014 | |
| JP | 2017-72122 A | | 4/2017 | |
| KR | 20180023685 A | * | 3/2018 | |
| WO | 2011/114452 A1 | | 9/2011 | |
| WO | WO-2014089443 A1 | * | 6/2014 | ............... B01D 1/04 |

OTHER PUBLICATIONS

Machine generated English language translation of JP2004016996. (Year: 2004).*
Farmanbordar, S., D. Kahforoushan, and E. Fatehifar. "A new method in the removal of Ca and Mg ions from industrial wastewater." Desalination and Water Treatment 57.19 (2016): 8904-8910. (Year: 2016).*
Machine generated translation of KR 20180023685 A (Year: 2018).*
International Preliminary Report on Patentability corresponding application No. PCT/JP2019/004224, mailed on Nov. 5, 2020.
Extended European Search Report for related European Application No. 19793856.6 dated May 21, 2021.
International Search Report for corresponding Application No. PCT/JP2019/004224, mailed Apr. 9, 2019.
Matsumoto et al., "The Application of Micro-Bubbles for Dissolution and Crystallization of Calcium Carbonate in Gas-Liquid-Solid System", Bulletin of the Society of Sea Water Science. Japan., 2004, 58, p. 475-486.
Office Action for related European Application No. 19793856.6 dated Feb. 17, 2022.

* cited by examiner

ION REMOVAL SYSTEM

TECHNICAL FIELD

The present invention relates to an ion removal system.

BACKGROUND ART

Conventionally, there have been disclosed ion removal systems for removing metal ion in hard water (e.g., see Patent Document 1).

The ion removal system in Patent Document 1 is intended to remove metal ion (calcium ion and magnesium ion) in hard water using an ion exchange resin. Specifically, the metal ion is removed from hard water in such a way that the metal ion in the hard water is replaced with sodium ion by making the hard water flow through a treatment tank containing an ion exchange resin having a surface attached with the sodium ion. Thereby, a hardness of the hard water is reduced to produce soft water. The metal ion present which have been contained in the hard water are captured on the surface of the ion exchange resin.

PRIOR ART DOCUMENTS

Patent Document

Patent Document 1: Japanese Patent Laid-Open Publication No. 2000-140840

SUMMARY OF THE INVENTION

Problems to be Solved by the Invention

However, the ion removal system in Patent Document 1 requires a large amount of salt water for regenerating the ion exchange resin which has captured the metal ion, so that there is a problem of troublesome maintenance. In addition, there is also the problem that the reproduction treatment causes reproduction waste water containing a large amount of salt water, resulting in increases in soil pollution and burden of sewage treatment. Furthermore, the treated water softened by the ion removal device has a high concentration of sodium ion, and may not be recommended as drinking water in certain areas.

As described above, the ion removal system using the ion exchange resin had a room for improvement from the viewpoints of maintainability and environmental property.

Therefore, an object of the present invention is to solve the aforementioned problems, and to provide an ion removal system having better maintainability and environmental property.

Means for Solving the Problems

In order to achieve the above-mentioned object, an ion removal system according to the present invention includes: a hard water storage configured to store hard water and a fine bubble generator configured to generate a fine bubble to supply the hard water storage with the fine bubble, for removing a metal ion from the hard water by adsorbing the metal ion in the hard water to the fines bubble in the hard water storage and crystallizing and precipitating the adsorbed metal ion; and a particle feeder configured to bring a particle containing a same element as that of the metal ion into the hard water at a feeding point, the feeding point being located upstream of the hard water storage or located in the hard water storage.

Effects of the Invention

According to the present invention, an ion removal system has better maintainability and environmental property.

MODES FOR CARRYING OUT THE INVENTION

As a result of intensive investigations, the present inventors have found a new finding that removal of the metal ion can be enhanced by using "fine bubble" which has never been used in ion removal technologies for removing metal ion from hard water (water-softening technologies), and this finding has led to the following invention.

Hereinafter, embodiments 1 to 3 according to the present invention will be explained in detail with reference to the drawings.

Embodiment 1

Figure 1:
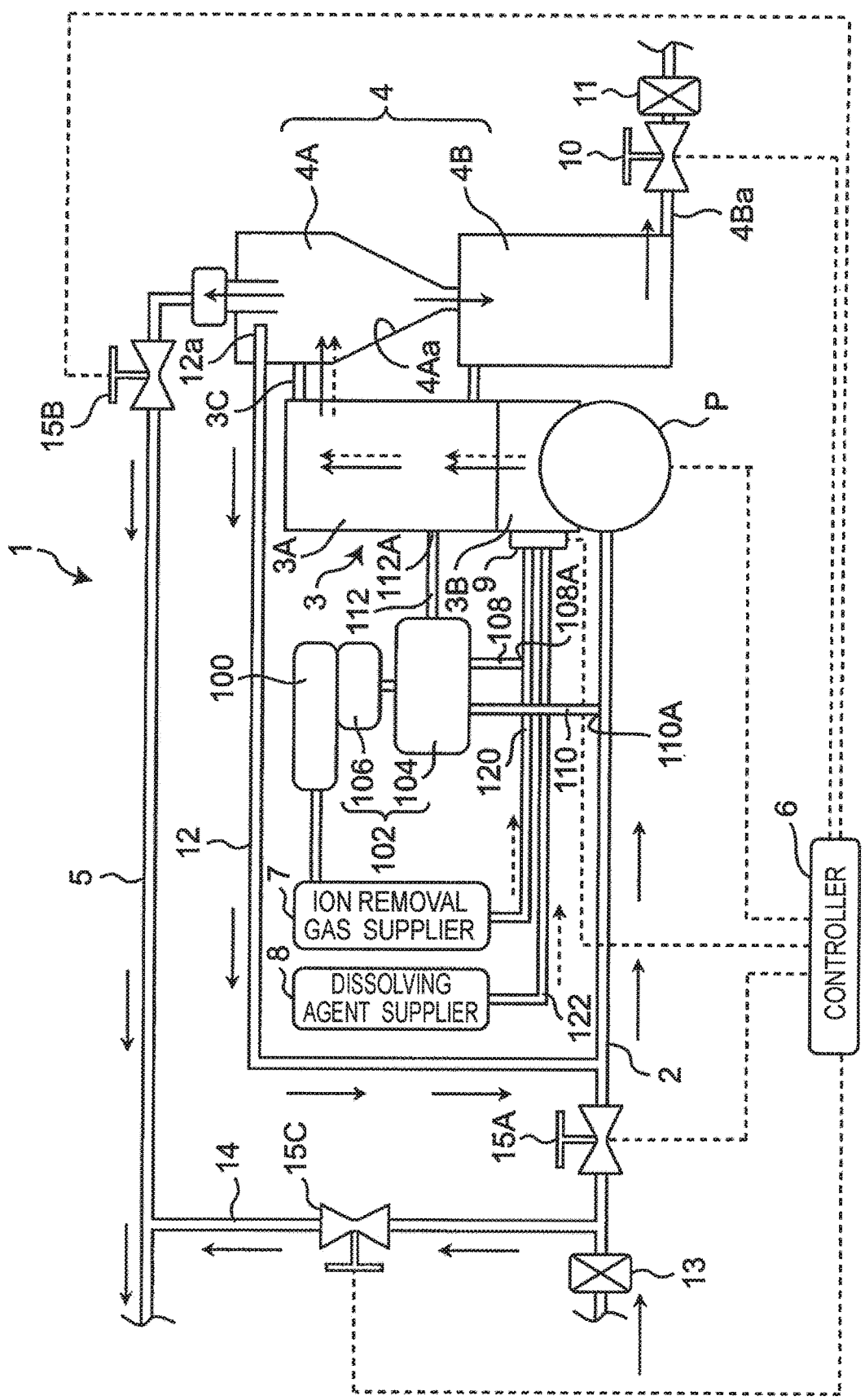
FIG. 1 shows a schematic view of an ion removal device according to embodiment 1.

FIG. 1 is a view showing a schematic configuration of an ion removal system 1 according to embodiment 1.
<Overall Configuration>

The ion removal system 1 according to embodiment 1 includes a primary flow path 2, an ion removal device 3, a separation device 4, and a secondary flow path 5.

The primary flow path 2 is connected to the ion removal device 3. The primary flow path 2 is a flow path for supplying hard water to the ion removal device 3. In embodiment 1, a pump P is provided in a connection point between the primary flow path 2 and the ion removal device 3. The pump P has a function to introduce the hard water flowing through the primary flow path 2 to the separation device 4 through the ion removal device 3. The pump P is controlled by a control unit 6.

The ion removal device 3 includes a hard water storage 3A configured to store hard water, and a fine bubble generator 3B configured to generate a fine bubble to be supplied to the hard water storage 3A. The ion removal device 3 is configured to adsorb a metal ion in hard water in the hard water storage 3A to the fine bubble to remove the metal ion from the hard water. The fine bubble generator 3B is disposed downstream of the pump P in the flow direction of the hard water so that gas does not enter the pump P.

In embodiment 1, the metal ion is calcium ion ($Ca^{2+}$) or magnesium ion ($Mg^{2+}$). Furthermore, in embodiment 1, the fine bubble refers to a bubble having a diameter of 100 μm or less. The fine bubble include a micro-bubble (having a diameter of e.g., 1 to 100 μm) and a nano-bubble (having a diameter of e.g., less than 1 μm). The microbubble may be a bubble that can be recognized by those skilled in the field of water treatment as having a bubble diameter of micro order. The nano-bubble may be a bubble that can be recognized by those skilled in the field of water treatment as having a bubble diameter of nano order. The fine bubble has different properties from normal bubbles in points of a long retention time in water, difficulty in combination with other bubbles due to difficulty in increasing the diameter as a single bubble; a tendency to chemically react due to a large contact area, and the like.

Incidentally, the fine bubble may include a small ratio of bubble having a diameter of 100 μm or more (such as a milli-bubble). For example, a bubble including 90% or more of bubble having a diameter of 100 μm or less may be defined as the fine bubble. In addition, a condition of 50% or more of bubble having a diameter of 60 μm or less, a condition of 5% or more of bubble having a diameter of 20 μm or less, and the like may be added. When measuring the diameter of the bubble (that is "bubble diameter"), for example, hard water containing the fine bubble may be directly photographed with a high-speed camera to calculate the bubble diameter by a three-point method in image processing. Alternatively, the bubble diameter may be measured by any other method. A timing of measuring the bubble diameter may be optionally selected as long as the fine bubble remains in the hard water storage. One example of the conditions for the aforementioned measuring method using a high-speed camera is as follows.

High-speed camera: FASTCAM 1024 PCI (PHOTRON LIMITED)
Lens system: Z16 APO (Leica Microsystems)
Objective lens: Planapo 2.0× (Leica Microsystems)
Shooting speed: 1000 fps
Shutter speed: 1/505000 sec
Image area: 1024×1024 pixel (microbubble shooting area 1.42 mm×1.42 mm, milli-bubble shooting area 5.69 mm×5.69 mm)
Image processing software: Image-Pro Plus (Media Cybermetics, Inc.)

In embodiment 1, an ion removal gas supplier 7 and a dissolving agent supplier 8 are connected to the fine bubble generator 3B via a gas switching mechanism 9.

The ion removal gas supplier 7 is configured to supply the fine bubble generator 3B with an ion removal gas for removing the metal ion in the hard water. The ion removal gas supplier 7 is, for example, an air pump for supplying gas. In embodiment 1, the ion removal gas supplier 7 is configured to supply "air" as the ion removal gas to the fine bubble generator 3B. The ion removal gas supplier 7 and the gas switching mechanism 9 are connected by an ion removal gas flow path 120.

In embodiment 1, an ion removal gas storage 100 is connected to the ion removal gas supplier 7. The ion removal gas storage 100 is configured to store the ion removal gas to be supplied to the ion removal gas supplier 7. The ion removal gas storage 100 is, for example, a gas storage tank or a high-pressure gas cylinder. The ion removal gas supplier 7 supplies the fine bubble generator 3B with the ion removal gas supplied from the ion removal gas storage 100.

In embodiment 1, the ion removal gas storage 100 is configured integrally with a particle storage 106 of a particle feeder 102 described later.

The ion removal gas supplier 7 is not limited to such a configuration, and may be a device in which the ion removal gas supplier 7 itself generates the ion removal gas.

The dissolving agent supplier 8 is configured to supply the fine bubble generator 3B with a dissolving gas, which is one example of a dissolving agent for dissolving a crystal of metal component precipitated as the metal ion removed from the hard water is crystallized. The dissolving agent supplier 8 and the gas switching mechanism 9 are connected by a dissolving agent flow path 122. In embodiment 1, the dissolving agent supplier 8 is configured to supply the fine bubble generator 3B with "carbon dioxide ($CO_2$)" as the dissolving gas. The dissolving agent supplier 8 is disposed upstream of the separation device 4 in the flow direction of the hard water so that the dissolving agent can be supplied to the separation device 4. The dissolving agent supplier 8 may include, for example, a tank filled with the dissolving agent. Alternatively, the dissolving agent supplier 8 may be a device configured to generate the dissolving agent. Furthermore, the dissolving agent supplier 8 may be a device to be connected to a dissolving agent supply source.

The gas switching mechanism 9 is a mechanism configured to perform switching so that either the ion removal gas or the dissolving gas is supplied to the fine bubble generator 3B. Switching by the gas switching mechanism 9 selectively performs a water-softening treatment with the ion removal gas or a reproduction treatment with the dissolving gas. The gas switching mechanism 9 is includes, for example, one or more valves. A switching operation of the gas switching mechanism 9 is controlled by the control unit 6.

When the gas switching mechanism 9 is switched to supply the ion removal gas, the fine bubble generator 3B generates a fine bubble containing the ion removal gas. Then, the fine bubble removes the metal ion and separates a crystal of metal component from the hard water, thereby softening the hard water. A principle of the water-softening treatment will be explained in detail later.

On the other hand, when the gas switching mechanism 9 is switched to supply the dissolving gas, the fine bubble generator 3B generates a fine bubble containing the dissolving gas. Then, the fine bubble performs reproduction of the separation device 4 by causing a crystal of metal component adhering to the separation device 4 to dissolve, as described later. A principle of the reproduction treatment will be explained in detail later.

The separation device 4 is connected to the ion removal device 3 via a connection flow path 3C provided at an upper outer peripheral of the hard water storage 3A. The separation device 4 is a device configured to separate the crystal of metal component precipitated as the metal ion removed from the hard water by the ion removal device 3 is crystallized. The ion removal device 3 and the separation device 4 can reduce a concentration (hardness) of the metal ion in the hard water to a predetermined concentration or less, thereby producing soft water. As the definitions of hard water and soft water, for example, the WHO definition may be used. That is, water having a hardness of less than 120 mg/L may be defined as soft water, and water having a hardness of 120 mg/L or more may be defined as hard water.

In embodiment 1, the separation device 4, having a tapered inner peripheral surface 4Aa whose diameter decreases as going down, is a cyclone-type centrifugal separator, where the hard water flows downward in spiral along the inner peripheral surface 4Aa to separate the crystal of metal component. In embodiment 1, the separation device 4 includes a separation section 4A having the inner peripheral surface 4Aa, and a crystal storage 4B configured to store the crystal of metal component.

The connection flow path 3C is connected to the separation section 4A so as to discharge the water that has passed through the ion removal device 3, in a direction eccentric from a central axis of the separation section 4A. Such an eccentric arrangement causes the water discharged into the separation section 4A to flow downward in spiral along the inner peripheral surface 4Aa. Metal ion having a large specific gravity removed from the hard water moves toward the inner peripheral surface 4Aa by centrifugal separation and then precipitates as the crystal of metal component in the vicinity of the inner peripheral surface 4Aa. Some of the crystal adhere to the inner peripheral surface 4Aa.

The crystal storage 4B is disposed below the separation section 4A. The crystal storage 4B includes a discharge flow path 4Ba configured to discharge water containing the crystal of metal component. The discharge flow path 4Ba is provided with an opening/closing valve 10 capable of opening and closing the discharge flow path 4Ba. An opening/closing operation of the opening/closing valve 10 is controlled by the control unit 6. A discharging-side backflow prevention mechanism 11 is provided downstream of the discharge flow path 4Ba of the opening/closing valve 10 in the discharge direction.

The discharging-side backflow prevention mechanism 11 is a mechanism configured to prevent the crystal of metal component from flowing back into the separation device 4. The discharging-side backflow prevention mechanism 11 can suppress the crystal of metal component from being mixed again into the treated water (that is, "soft water") obtained by the separation of the crystal of metal component from the hard water. The discharging-side backflow prevention mechanism 11 includes, for example, one or more check valves. Alternatively, the discharging-side backflow prevention mechanism 11 may be includes, for example, a vacuum breaker. Furthermore, the discharging-side backflow prevention mechanism 11 may be configured to provide a spout space at an outlet of the discharge flow path 4Ba in order to prevent backflow.

The secondary flow path 5 is connected to the separation device 4. The secondary flow path 5 is a flow path for taking out the treated water, in which the crystal of metal component has been separated, from the separation device 4. In embodiment 1, since the separation device 4 is a cyclone-type centrifugal separator, the crystal of metal component can be collected in the vicinity of the inner peripheral surface 4Aa. In order to suppress the crystal of metal component from entering the secondary flow path 5, the secondary flow path 5 is connected to an upper central position of the separation section 4A away from the inner peripheral surface 4Aa.

The treated water flowing through the secondary flow path 5 is supplied to, for example, a kitchen, a bathroom, a toilet, a washbasin, and the like. When a flow rate of the liquid from the primary flow path 2 to the secondary flow path 5 is drastically reduced by use of the treated water, a centrifuge separation speed of the metal ion from the hard water may be decreased, leading to a decreased removing efficiency of the metal ion. Also, the crystal of metal component may be mixed into the treated water.

Therefore, in embodiment 1, a return flow path 12 is connected between the separation device 4 and the primary flow path 2, which returns to the primary flow path 2 some of the treated water in which the crystal of metal component has been separated from the hard water by the separation device 4. That is, a circulation flow path is constituted by the primary flow path 2, the ion removal device 3, the separation device 4, and the return flow path 12. With this circulation flow path, fluctuations in the flow rate of the liquid flowing from the primary flow path 2 to the secondary flow path 5 can be further stabilized, suppressing a decreased removing efficiency of the metal ion. Furthermore, driving the pump P to forcibly circulate the liquid in the circulation flow path can further stabilize the fluctuations in the flow rate of the liquid, further suppressing the decreased removing efficiency of the metal ion. Furthermore, the crystal of metal component can be suppressed from being mixed into the treated water.

It is preferable that the flow rate of the liquid flowing through the circulation flow path is equal to or higher than the flow rate of the soft water to be used (e.g., 2 L/min). As the flow rate of the liquid flowing through the circulation flow path is higher than the flow rate of the soft water to be used, the fluctuations in the flow rate of the liquid can be more stabilized, thereby producing soft water stably. Furthermore, it is preferable that the circulation flow path is a closed system. Thereby, air is suppressed from entering the circulation flow path, and thus the fluctuations in the flow rate of the liquid can be further stabilized.

In embodiment 1, one end 12a of the return flow path 12 is opened toward the central axis of the separation section 4A. Thereby, the crystal of metal component, which have precipitated in the vicinity of the inner peripheral surface 4Aa, is suppressed from entering the return flow path 12. Furthermore, the connection flow path 3C of the ion removal device 3 is connected to the separation section 4A below the one end 12a of the return flow path 12. That is, the one end 12a of the return flow path 12 is located above the outlet of the connection flow path 3C from which the hard water in which the metal ion have been removed is discharged downward in a spiral shape. This arrangement further suppresses the crystal of metal component, which have precipitated in the vicinity of the inner peripheral surface 4Aa, entering the return flow path 12.

A supply-side backflow prevention mechanism 13 is provided in the primary flow path 2. The supply-side backflow prevention mechanism 13 is a mechanism configured to prevent the fine bubble and the treated water from flowing back to the supply side of the hard water. The supply-side backflow prevention mechanism 13 includes, for example, one or more check valves. In embodiment 1, the supply-side backflow prevention mechanism 13 is provided upstream of the return flow path 12 in the flow direction of the hard water flowing in the primary flow path 2. Thereby, the fine bubble, the treated water, and the like can be more reliably prevented from flowing back to the supply-side of the hard water.

Furthermore, when maintenance is required, for example, due to a failure of the ion removal device 3 or the like, water cannot be used during the maintenance. Therefore, in embodiment 1, the primary flow path 2 and the secondary flow path 5 are connected with each other by a bypass flow path 14. The ion removal system 1 also includes a flow switching mechanism configured to switch the flow direction of the hard water flowing through the primary flow path 2 to either the ion removal device 3 or the bypass flow path 14. Switching by the flow switching mechanism can cause the hard water flowing through the primary flow path 2 to flow to the secondary flow path 5 through the bypass flow path 14, so that the hard water can be used even during maintenance. In addition, switching by the flow switching mechanism enables the hard water and the treated water (soft water) to be selectively used, not even during maintenance.

In embodiment 1, the flow switching mechanism includes a first valve 15A capable of opening and closing the primary flow path 2, a second valve 15B capable of opening and closing the secondary flow path 5, and a third valve 15C capable of opening and closing the bypass flow path 14. Opening/closing operations of the first valve 15A, the second valve 15B, and the third valve 15C are controlled by the control unit 6.

The control unit 6 is configured to selectively execute first control to open the first valve 15A and the second valve 15B while closing the third valve 15C, or second control to close the first valve 15A and the second valve 15B while opening the third valve 15C. When the control unit 6 executes the first control, the hard water flowing through the primary flow path 2 goes to the ion removal device 3 to be softened and then goes into the secondary flow path 5. Thereby, the treated water (soft water) is discharged from the outlet of the secondary flow path 5. When the control unit 6 executes the second control, the hard water flowing through the primary flow path 2 goes to the secondary flow path 5 through the bypass flow path 14. Thereby, the hard water is discharged from the outlet of the secondary flow path 5. That is, executing the first control or the second control by the control unit 6 enables selective discharging of the hard water or the treated water (that is, soft water) from the outlet of the secondary flow path 5.

In embodiment 1, a particle feeder 102 is further provided. The particle feeder 102 is a device configured to bring a particle containing the same element as that of the metal ion into the hard water. The particle feeder 102 in embodiment 1 brings a particle of $CaCO_3$ (that is, calcium carbonate) containing Ca that is the same element as $Ca^{2+}$ (that is, calcium ion) of the metal ion. Bringing the particle of $CaCO_3$ into the hard water promotes the reaction of crystallizing $Ca^{2+}$ and precipitating them as $CaCO_3$ as described later.

The particle feeder 102 of embodiment 1 includes a particle feeding mechanism 104 and a particle storage 106. The particle feeding mechanism 104 has a mechanism configured to bring the particle described above into the hard water. An example of the particle feeding mechanism 104 includes an extruder and a particle-containing soluble agent (that is, a solid material that contains a particle and is soluble in water). In particular, the particle feeding mechanism 104 of embodiment 1 pushes out a gel particle to be brought into the hard water. The particle storage 106 is a member configured to store the particle to be supplied to the particle feeding mechanism 104. The particle storage 106 is, for example, a particle storage tank.

The particle feeder 102 includes a first flow path 108, a second flow path 110, and a third flow path 112. The first flow path 108 is a flow path to connect the particle feeding mechanism 104 to the ion removal gas flow path 120. The second flow path 110 is a flow path to connect the particle feeding mechanism 104 to the primary flow path 2. The third flow path 112 is a flow path to connect the particle feeding mechanism 104 to the hard water storage 3A.

The particle feeder 102 is controlled by the control unit 6 so as to bring particle into the hard water via any one of the first flow path 108, the second flow path 110, and the third flow path 112.

When the first flow path 108 is selected, the particle is brought into the ion removal gas flow path 120. Then, a first feeding point 108A exists in the ion removal gas flow path 120. When the second flow path 110 is selected, the particle is brought into the primary flow path 2. Then, a second feeding point 110A exists in the primary flow path 2. When the third flow path 112 is selected, the particle is brought into the hard water storage 3A. Then, a third feeding point 112A exists in the hard water storage 3A.

<Water-Softening Treatment>

Next, a principle of a water-softening treatment using a fine bubble will be explained in more detail.

It is predicted that once a fine bubble containing air is supplied into hard water, actions as described in the following sections (1) and (2) are caused on the metal ion in the hard water. Specifically, it is predicted that the crystal of metal component can be removed from the hard water by adsorbing the metal ion in the hard water to the fine bubble and crystallizing the adsorbed metal ion. More specifically, the process is as follows. Note that the present invention is not necessarily restricted to the specific principle described in the following sections (1) and (2).

(1) Metal Ion Adsorption

Figure 2:
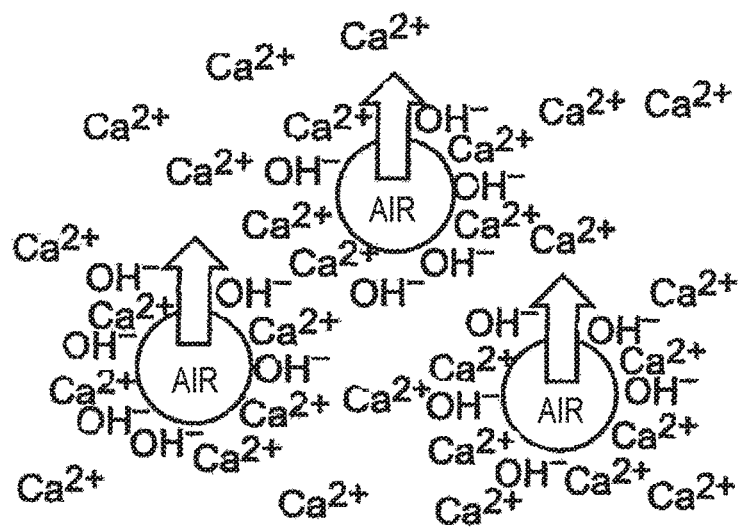
FIG. 2 shows a schematic view for explaining a hypothetical principle of metal ion adsorption with the ion removal device according to embodiment 1.

As shown in FIG. 2, once the fine bubble containing air is supplied into the hard water, $H^+$ (that is, hydrogen ion) and $OH^-$ (that is, hydroxide ion) are mixed on the surface of the fine bubble, in which $H^+$ is positively charged and OH is negatively charged (only $OH^-$ is shown in FIG. 2). On the other hand, the hard water contains $Ca^{2+}$ and $Mg^{2+}$ as positively charged metal ion. In the following explanation, $Ca^{2+}$ will be taken as an example of the metal ion.

The positively charged $Ca^{2+}$ is adsorbed to $OH^-$ existing on the surface of the fine bubble by the intermolecular force action (that is, interionic interaction). In this manner, $Ca^{2+}$ can be adsorbed to the fine bubble. Incidentally, although the surface of the fine bubble has $H^+$ which repels $Ca^{2+}$, it is considered that $OH^-$ acts more preferentially than $H^+$ and adsorbs $Ca^{2+}$. This "adsorption of metal ion" is mainly performed in the ion removal device 3.

(2) Crystallization of Metal Ion

Figure 3:
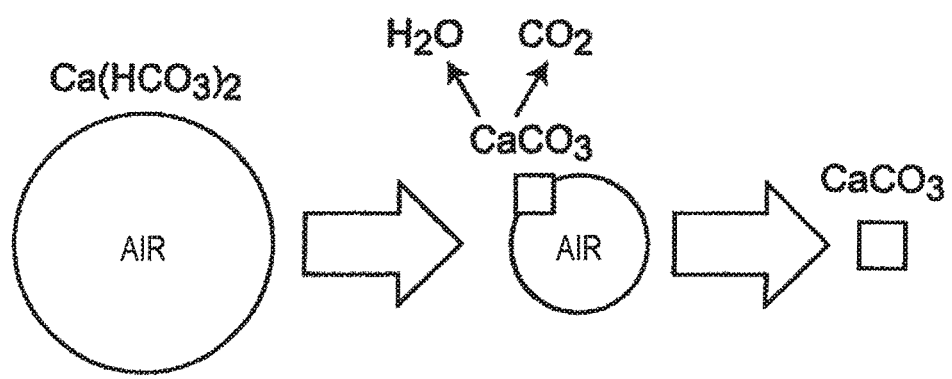
FIG. 3 shows a schematic view for explaining a hypothetical principle of metal ion crystallization with the ion removal device according to embodiment 1.

In addition to the reaction shown in FIG. 2, the supply of the fine bubble containing air into the hard water promotes the reaction shown in FIG. 3. Specifically, unlike normal bubbles, the fine bubble supplied into the hard water is difficult to rise up, and dissolves in the hard water, and therefore gradually contracts by an increased surface tension as shown in FIG. 3. As described above, $Ca^{2+}$ is adsorbed to the surface of the fine bubble. More specifically, $Ca^{2+}$ exists as a calcium ion of a soluble $Ca(HCO_3)_2$ (that is, calcium bicarbonate). Herein, as the fine bubble gradually contracts, a concentration of the dissolved $Ca^{2+}$ on the surface of the fine bubble increases. Because of the increase in the concentration of the dissolved $Ca^{2+}$, the $Ca^{2+}$ becomes supersaturated at some point, and then crystallizes and precipitates. A specific chemical equation representing this process is as the following equation 1.

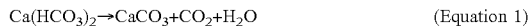

$$Ca(HCO_3)_2 \rightarrow CaCO_3 + CO_2 + H_2O \quad \text{(Equation 1)}$$

Since $CaCO_3$ (that is, calcium carbonate) is insoluble (that is, water insoluble), $CaCO_3$ precipitates as a crystal of metal component. Thereby, the $Ca^{2+}$ dissolved as $Ca^{2+}$ of $Ca(HCO_3)_2$ precipitated as a crystal. With such a reaction promoted, $CaCO_3$ precipitated as $Ca^{2+}$ of a metal ion is crystallized can be separated from the hard water. This "crystallization of metal ion" is mainly performed in the separation section 4A of the separation device 4.

Incidentally, although a reaction reverse to the equation 1 may also occur in the same water, it is predicted that by continuously supplying the fine bubble, the reaction in the direction of the equation 1 preferentially occurs in the equilibrium relationship. Furthermore, since the reaction reverse to the equation 1 basically does not occur unless $CO_2$ gas is blown from the outside, it is considered that the reaction in the direction of the equation 1 preferentially occurs.

In embodiment 1, since the separation device 4 is a cyclone-type centrifugal separator, the crystal of metal component precipitates in the vicinity of the inner peripheral surface 4Aa of the separation section 4A to be stored in the crystal storage 4B. The crystal of metal component stored in the crystal storage 4B is discharged through the discharge flow path 4Ba when the opening/closing valve 10 is opened. Separating the crystal of metal component from the hard water in this way achieves softening of the hard water.

Furthermore, in embodiment 1, the particle of $CaCO_3$ is brought into the hard water by using the particle feeder 102. Specifically, the particle of $CaCO_3$ is brought through any one of the first flow path 108, the second flow path 110, the third flow path 112 by controlling the particle feeder 102 with the control unit 6.

Bringing the particle of $CaCO_3$ containing Ca, which is the same element as $Ca^{2+}$ of the metal ion, leads to adsorption of the calcium ion to crystal nuclei, thereby increasing the adsorption amount of the metal ion. Therefore, the crystallization of the metal ion explained above can be promoted. Also, when the particle of $CaCO_3$ is brought, a reaction, in which the $Ca^{2+}$ ions and $CO_3^{2-}$ ions dissolved in water are used for the growth of particle, only occurs, so that the crystallization can be promoted.

When the first flow path 108 is used, the particle of $CaCO_3$ is brought to the first feeding point 108A located in the ion removal gas flow path 120. The particle of $CaCO_3$ is supplied to the fine bubble generator 3B from the first feeding point 108A. In the fine bubble generator 3B, a fine bubble is generated with the particle of $CaCO_3$. Therefore, the particle of $CaCO_3$ can be supplied into the hard water in the state of being mixed with the fine bubble. Thereby, the crystallization of the metal ion adsorbed to the fine bubble in the hard water storage 3A can be further promoted.

When the second flow path 110 is used, the particle of $CaCO_3$ is brought to the second feeding point 110A located in the primary flow path 2. The particle of $CaCO_3$ is supplied to the fine bubble generator 3B from the second feeding point 110A via the pump P. Similarly to the case of using the first flow path 108, the particle is supplied at an upstream point of the fine bubble generator 3B, and thus a fine bubble can be generated with the fine bubble generator 3B including the particle. Therefore, the same effects as in the case of using the first flow path 108 can be exhibited.

When the third flow path 112 is used, the particle of $CaCO_3$ is brought to the third feeding point 112A located in the hard water storage 3A. Unlike the cases of using the first flow path 108 and the second flow path 110, the particle of $CaCO_3$ is brought to the downstream point of the fine bubble generator 3B. With such a configuration, since the particle of $CaCO_3$ is directly brought into the hard water storage 3A, the charge amount of the particle of $CaCO_3$ can be controlled by the control unit 6, and thus the crystallization of the metal ion in the hard water storage 3A can be controlled precisely.

<Reproduction Treatment>

Next, a principle of a reproduction treatment using a fine bubble will be explained in more detail.

By performing a water-softening treatment, some of $CaCO_3$ precipitated as the metal ion is crystallized adhere to the inner peripheral surface 4Aa of the separation section 4A. As a treatment for returning this $CaCO_3$ to $Ca(HCO_3)_2$, a reproduction treatment is performed. Specifically, the fine bubble generator 3B generates a fine bubble containing carbon dioxide, which is a gas different from that used in the water-softening treatment.

Figure 4:
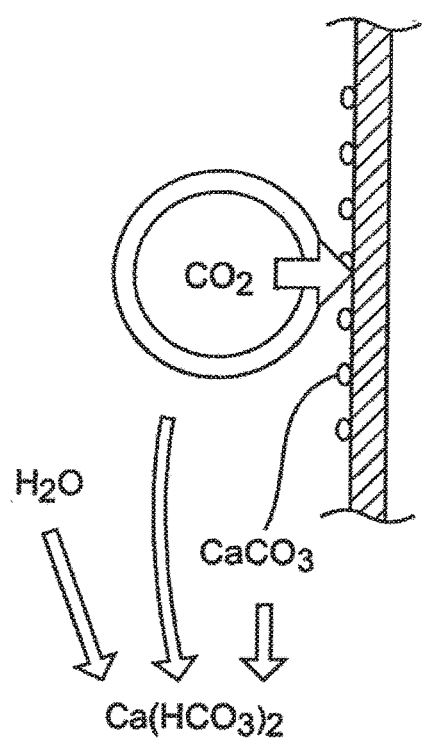
FIG. 4 shows a schematic view for explaining a hypothetical principle of reproduction treatment with the ion removal device according to embodiment 1.

As shown in FIG. 4, the following reaction is promoted by supplying fine bubble of carbon dioxide to $CaCO_3$ adhering to the inner peripheral surface 4Aa of the separation section 4A.

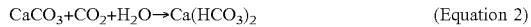
$$CaCO_3+CO_2+H_2O \rightarrow Ca(HCO_3)_2 \qquad \text{(Equation 2)}$$

This reaction produces soluble (that is, water-soluble) $Ca(HCO_3)_2$ from insoluble $CaCO_3$. $Ca(HCO_3)_2$ dissolves in water and moves to the crystal storage 4B. $Ca(HCO_3)_2$ that has moved to the crystal storage 4B is discharged through the discharge flow path 4Ba when the opening/closing valve 10 is opened. Thereby, the insoluble $CaCO_3$ adhering to the inner peripheral surface 4Aa of the separation section 4A is discharged to the outside, and the inner peripheral surface 4Aa can be returned to its original state. Thereafter, the aforementioned water-softening treatment can be performed again.

In the above description, although $Ca^{2+}$ has been taken as an example of the metal ion, it is predicted that the same reaction occurs as for $Mg^{2+}$.

As described above, when a metal ion is removed from hard water by using an ion exchange resin, a large amount of salt water is required to reproduce the ion exchange resin. On the other hand, according to the ion removal system 1 of embodiment 1, the metal ion is removed from the hard water by using the fine bubble, so that a large amount of salt water to be required for reproducing an ion exchange resin is unnecessary. Thereby, the reproduction treatment can be simplified, and maintenance can be performed easily. Furthermore, since reproduction waste water containing salt water is not caused, soil pollution and a burden on sewage treatment can be suppressed, and environmental property can be improved. Furthermore, the concentration of sodium ion in the treated water does not increase, so that the generated treated water can be used as drinking water.

Still furthermore, according to the ion removal system 1 of embodiment 1, since air is used as the ion removal gas, the costs for generating the fine bubble can be reduced to an extremely low level.

Still furthermore, according to the ion removal system 1 of embodiment 1, the reproduction treatment is performed by supplying the fine bubble of carbon dioxide as the dissolving gas after the metal ion is removed from the hard water. Thereby, the reaction of producing soluble $Ca(HCO_3)_2$ from insoluble $CaCO_3$ can be promoted, and thus the reproduction treatment can be promoted.

Still furthermore, according to the ion removal system 1 of embodiment 1, the metal ion is $Ca^{2+}$ and the particle is $CaCO_3$. Since $Ca^{2+}$ becomes $CaCO_3$ when crystallized, the reaction of crystallizing $Ca^{2+}$ in the hard water can be improved by bringing $CaCO_3$ into the hard water in advance.

Still furthermore, according to the ion removal system 1 of embodiment 1, the particle feeder 102 includes the particle feeding mechanism 104 and the particle storage 106. With such a configuration, each of the particle feeding mechanism 104 and the particle storage 106 can be configured in various modes, and therefore the degree of freedom in designing the particle feeder 102 is improved. Still furthermore, in embodiment 1, the particle storage 106 and the ion removal gas storage 100 are integrated with each other. With such a configuration, the particle and the ion removal gas can be easily replenished, thereby improving user convenience.

Still furthermore, according to the ion removal system 1 of embodiment 1, the particle feeder 102 brings the gel particle. With such a configuration, the particle can be brought more easily to the feeding points than the case of using powder or the like.

Experimental Example 1

Next, experimental example 1 performed to confirm the principle of water-softening treatment by fine bubble will be explained. Here, an experiment was conducted using a device 20 shown in FIGS. 5A and 5B.

Figure 5A:
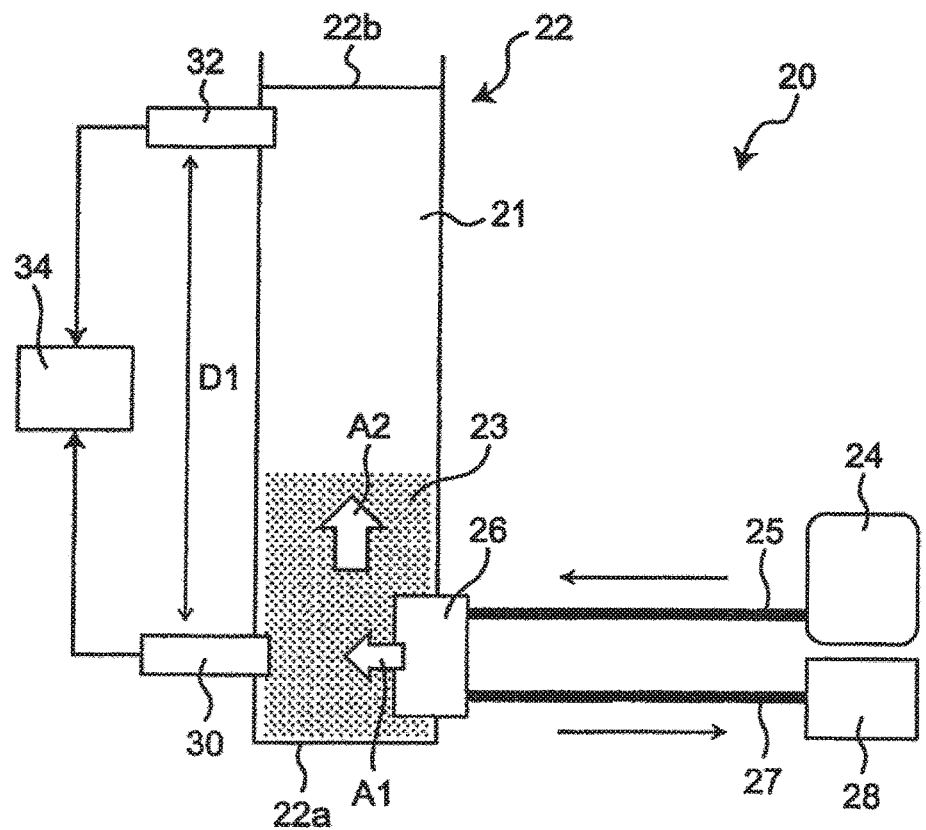
FIG. 5A is a view showing a schematic configuration of a device used in experimental example 1, showing a state after a predetermined time has elapsed since generation of fine bubble.
Figure 5B:
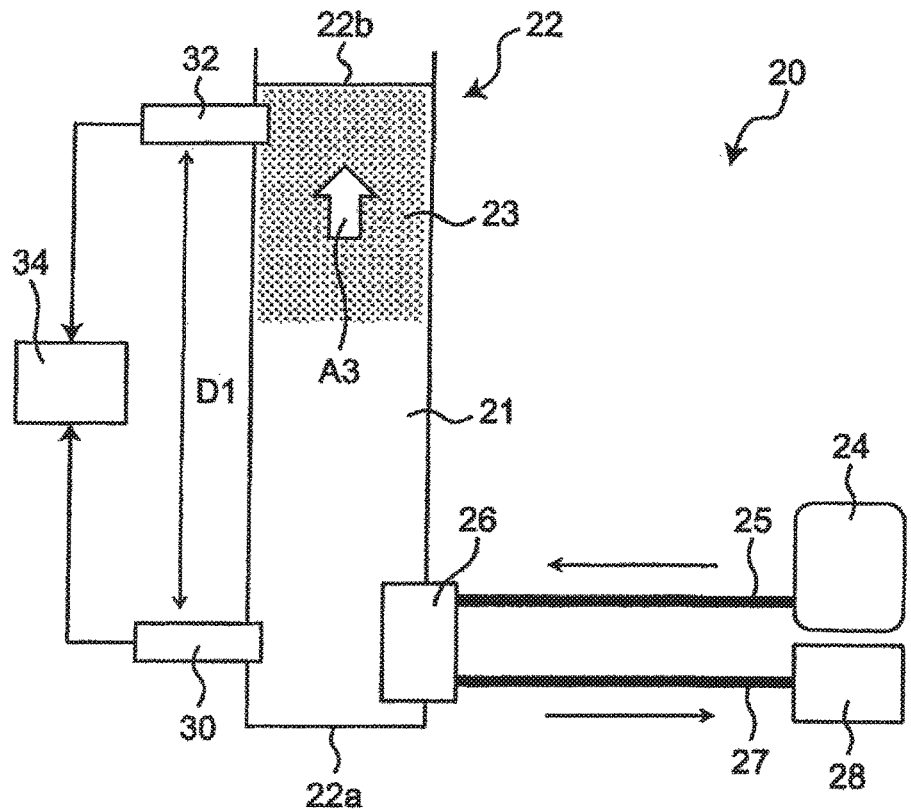
FIG. 5B is a view showing the schematic configuration of the device used in experimental example 1, showing a state after a predetermined time has further elapsed since the state shown in FIG. 5A.

FIGS. 5A and 5B present schematic configurations of the device 20 used in Experimental example 1. FIG. 5A presents a state a predetermined time after generating fine bubble (specifically, after 15 seconds), and FIG. 5B presents a state further a predetermined time after the state shown in FIG. 5A (specifically, after 45 seconds). The state of FIG. 5A corresponds to a state 15 seconds after generating the fine bubble in FIG. 6, and the state of FIG. 5B corresponds to a state 60 seconds after generating the fine bubble in FIG. 6.

The device 20 shown in FIGS. 5A and 5B refers to an experimental device capable of supplying fine bubble 23 from a bottom face side in a water tank 22 (hard water storage section) for storing a hard water 21. In the device 20, a concentration of the metal ions in the hard water 21 can be measured at two points, the bottom face side and the water surface side. The fine bubble 23 were supplied into the water tank 22 using this device 20, and results of detecting transitions of the metal ion concentrations at the bottom face side and the water surface side shown in FIG. 6 were obtained.

Figure 6:
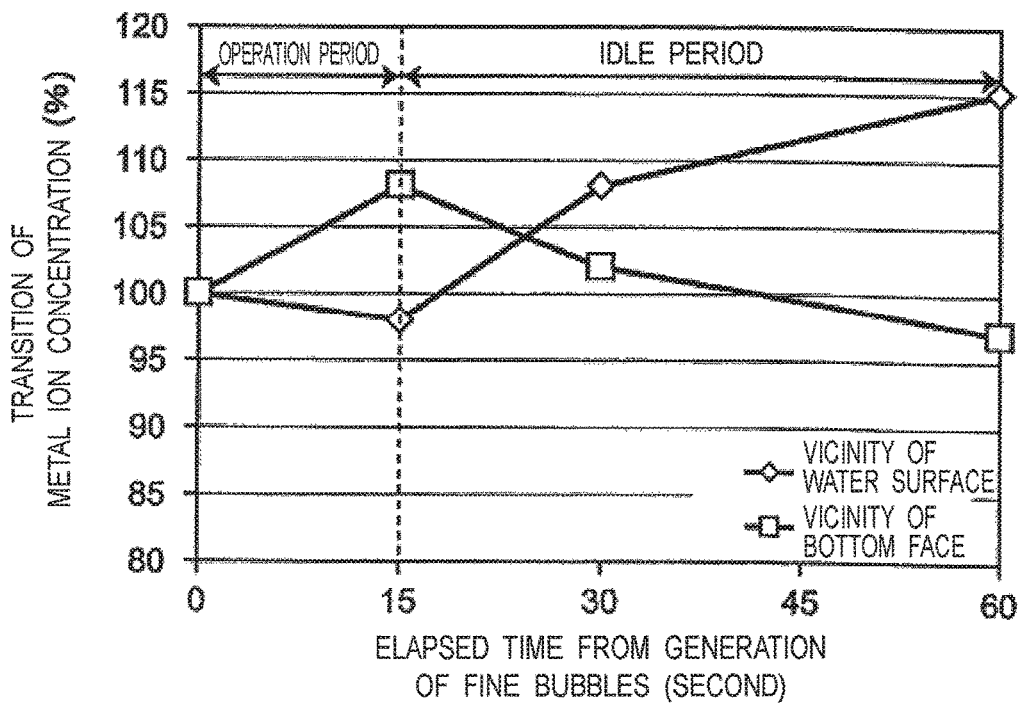
FIG. 6 is a graph showing results of experimental example 1.

The results shown in FIG. 6 could demonstrate an effect of "metal ion adsorption by fine bubble" explained above. Specific results will be described later.

As shown in FIGS. 5A and 5B, the device 20 includes the water tank 22, a gas supply section 24, a first pipe 25, a fine bubble generation section 26, a second pipe 27, a pump 28, and a first water intake section 30, a second water intake section 32, and a metal ion concentration detector 34.

The water tank 22 refers to a water tank for storing the hard water 21. In the example shown in FIGS. 5A and 5B, the water tank 22 is configured so as to be a vertically long tank. The gas supply section 24 refers to a member for supplying a gas to the fine bubble generation section 26 through the first pipe 25. The fine bubble generation section 26 refers to a device for generating the fine bubble 23 originating from the gas supplied from the gas supply section 24. The fine bubble generation section 26 corresponds to the aforementioned fine bubble generator 3B. The gas is supplied from the gas supply section 24 to the fine bubble generation section 26 by a negative pressure effect of the pump 28 through the second pipe 27.

The first water intake section 30 refers to a member for taking the sample water of the hard water 21 from a vicinity of a bottom face 22a of the water tank 22. The second water intake section 32 refers to a member for taking the sample water from a vicinity of a water surface 22b of the water tank 22. Height positions of the first water intake section 30 and the second water intake section 32 may be set to any position, and a distance D1 from the first water intake section 30 to the second water intake section 32 can be adjusted to a desired value.

In the examples shown to FIGS. 5A and 5B, the height position of the first water intake section 30 is set to substantially the same position as the height position where the fine bubble 23 are produced by the fine bubble generation section 26.

The metal ion concentration detector 34 refers to a member for detecting a metal ion concentration in the sample water taken from the first water intake section 30 and the second water intake section 32.

In the above configuration, once the fine bubble generation section 26 and the pump 28 are operated, the gas is sent from the gas supply section 24 to the fine bubble generation section 26 through the first pipe 25 by the negative pressure effect of the pump 28 through the second pipe 27. The fine bubble generation section 26 generates the fine bubble 23 using this gas as a raw material and supplies the gas to the water tank 22 (arrow A1 in FIG. 5A).

The fine bubble 26 and the pump 28 are operated for a predetermined period (15 seconds in embodiment 1) to continuously generate the fine bubble 23.

Subsequently, the operation of the fine bubble 26 and the pump 28 is terminated. After terminating the operation, a predetermined idle period is provided (45 seconds in embodiment 1).

As shown in FIG. 5A, at the end of the operation period (15 seconds after generation of the fine bubble), it was visually confirmed that the fine bubble 23 supplied into the water tank 22 ascended in the hard water 21 (arrow A2) and accumulated in a lower part of the water tank 22.

As shown in FIG. 5B, at the end of the idle period (60 seconds after generation of the fine bubble), it was visually confirmed that the fine bubble 23 supplied into the hard water 21 further ascended, reached the water surface 22b (arrow A3), and accumulated in an upper part of the water tank 22.

At a predetermined timing during the operation, the sample water was taken out from the first water intake section 30 and the second water intake section 32, and results of measuring the metal ion concentration by the metal ion concentration detector 34 are shown in FIG. 6.

Specific experimental conditions regarding the results in FIG. 6 will be described below.

(Experimental Condition)
Type of gas supplied by the gas supply section 24: air
Hardness of the hard water 21: about 300 mg/L
Temperature of the hard water 21: 25° C.
Distance D1 from the first water intake section 30 to the second water intake section 32: about 1 m
Operation period of the fine bubble generation section 26 and the pump 28: 15 seconds
Idle period of the fine bubble generation section 26 and the pump 28: 45 seconds
Metal ion concentration detector 34: LAQUA F-70 manufactured by HORIBA, Ltd.
Metal ion to be measured: $Ca^{2+}$
Timing for taking the sample water: 0 seconds, 15 seconds, 30 seconds, and 60 seconds after the start of the operation In FIG. 6, the abscissa represents an elapsed time (seconds) from generation of the fine bubble, and the ordinate represents a concentration transition (%) of the metal ions ($Ca^{2+}$) detected by the metal ion concentration detector 34. The metal ion concentration transition represents a metal ion concentration transition relative to 100% of the metal ion concentration measured at the start of the operation.

As shown in FIG. 6, after 15 seconds, a concentration of the sample water extracted from the first water intake section 30 in the vicinity of the bottom face 22a of the water tank 22 increases to about 108%. Afterward, the concentration gradually decreases at the idle period and finally decreases to about 97%.

On the other hand, the concentration of the sample water extracted from the second water intake section 32 in the vicinity of the water surface 22b of the water tank 22 is retained at 100% until 15 seconds have passed, then gradually increases at the subsequent idle period, and finally incrementally increases to about 115%.

A result of associating the result of the metal ion concentration transition with the behavior of the fine bubble 23 is as below.

At the time when 15 seconds have passed, as shown in FIG. 5A, the metal ion concentration increases in the sample water in the first water intake section having the accumulating fine bubble 23. On the other hand, the metal ion concentration is mostly unchanged in the sample water in the second water intake section 32 having no accumulating fine bubble 23.

At the time when 60 seconds have passed, as shown in FIG. 5B, the metal ion concentration decreases to just under 100% in the sample water in the first water intake section 30 having no accumulating fine bubble 23. On the other hand, the metal ion concentration remarkably increases in the sample water in the second water intake section 32 having the accumulating fine bubble 23.

According to such a result, it is predicted that $Ca^{2+}$ as a metal ion in the hard water 21 is adsorbed by the fine bubble 23 and ascends as the fine bubble 23 ascend.

Based on the above prediction, the effect of "metal ion adsorption by fine bubble" explained above could be demonstrated.

Embodiment 2

The ion removal system according to embodiment 2 of the present invention will be explained. Note that primarily points different from the points in embodiment 1 will be explained in embodiment 2. In embodiment 2, the same or similar constituents as those in embodiment 1 are described with the same reference numerals as in embodiment 1. In embodiment 2, descriptions overlapping those in embodiment 1 are omitted.

Embodiment 2 differs from embodiment 1 in that, as the gas for fine bubble in the water-softening treatment, not air but nitrogen is used in embodiment 2.

It is predicted that not only the actions of the aforementioned "(1) Metal Ion Adsorption" and "(2) Metal Ion Crystallization" but also the actions as described in the following sections (3) and (4) are enhanced by generating the fine nitrogen bubbles from the fine bubble generator 3B to supply the bubbles into hard water. Note that the present invention is not necessarily restricted to the specific principle described in the following sections (3) and (4).

(3) Enhancement of Metal Ion Adsorption

As shown in FIG. 7(a), there are charged $H^+$ and $OH^-$ around the fine bubble. As described above, the negatively charged $OH^-$ adsorbs the positively charged $Ca^{2+}$. Under such a circumstance, when nitrogen is used for the fine bubble, the reaction of the following formula 3 is enhanced.

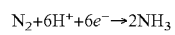
$$N_2 + 6H^+ + 6e^- \rightarrow 2NH_3$$

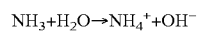
$$NH_3 + H_2O \rightarrow NH_4^+ + OH^- \qquad \text{(Formula 3)}$$

Enhancement of the reaction of Formula 3 decreases the number of $H^+$ ions relative to the number of $OH^-$ ions, as shown in FIG. 7(b). Thereby, the negative charge on the fine bubble becomes higher, and the positively charged $Ca^{2+}$ becomes easy to adsorb.

In the case of using nitrogen as in embodiment 2, the reaction of Formula 3 can be enhanced compared to the case of using air as in embodiment 1, and therefore the metal ion adsorption is further enhanced. Thereby, more metal ions can be separated and removed from hard water.

The aforementioned principle is not limited to nitrogen, and possibly any gas capable of reacting with $H^+$ ions to reduce the number of $H^+$ ions relative to the number of $OH^-$ ions is also applicable.

(4) Enhancement of Metal Ion Crystallization

Since nitrogen is an inert gas different from air, once nitrogen is supplied into hard water, the partial pressure balance of the gas contained in hard water is lost. Thus, the reaction as shown in FIG. 8 is enhanced.

Figure 8:
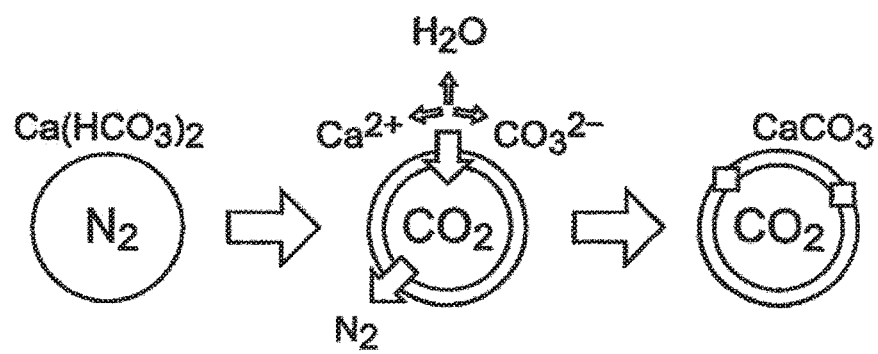
FIG. 8 is a schematic view for explaining a hypothetical principle of metal ion crystallization with the ion removal device according to embodiment 2.

As shown in FIG. 8, other gas components dissolved in hard water acts to replace the fine bubble composed of nitrogen. In the example shown in FIG. 8, $Ca(HCO_3)_2$ present around the fine bubble contains $CO_2$, and this $CO_2$ is extracted and acts to replace nitrogen. That is, the following reaction is enhanced.

$$Ca(HCO_3)_2 \rightarrow CaCO_3 + CO_2 + H_2O \qquad \text{(Formula 4)}$$

As described above, a reaction for generating insoluble $CaCO_3$ from soluble $Ca(HCO_3)_2$ is caused. At this time, $CO_2$ and $H_2O$ are produced. Since $CaCO_3$ is insoluble, it precipitates as crystal of metal ion.

The above reaction makes it possible to crystallize and precipitate the metal ion contained as $Ca^{2+}$ of $Ca(HCO_3)_2$ in hard water. Thereby, the crystal of metal ion can be removed from hard water.

The aforementioned principle is not limited to nitrogen, and possibly any gas other than air that loses the partial pressure balance of the gas dissolved in hard water is also applicable.

As described above, in embodiment 2, the reactions explained in the sections "(3) Enhancement of Metal Ion Adsorption" and "(4) Enhancement of Metal Ion Crystallization" can be enhanced compared to the case using air by generating fine bubble incorporating nitrogen and supplying the fine bubble into hard water. Thereby, precision of the metal ion removal from hard water can be improved.

Embodiment 3

The metal ion removal method with the ion removal system according to embodiment 3 of the present invention will be explained. In embodiment 3, primarily points different from points in embodiments 1 and 2 will be explained, and descriptions overlapping the descriptions in embodiments 1 and 2 are omitted.

Embodiment 3 defers from embodiments 1 and 2 in that the fine bubble generator 3B generates the fine bubble including air in embodiments 1 and 2, whereas the fine bubble including a mixture gas of a plurality of gases in embodiment 3.

In embodiment 3, a mixture gas of two gases, a first gas which is a basic gas and a second gas which has a slower solution velocity than of the first gas is used as a mixture gas for generating fine bubble. That is, the ion removal gas supplier 7 shown in FIG. 1 supplies the fine bubble generator 3B with a mixture gas of the first gas and the second gas as an ion removal gas.

It is predicted that not only the actions of the aforementioned "(1) Metal Ion Adsorption" and "(2) Metal Ion Crystallization" but also the actions as described in the following sections (5) and (6) are enhanced by generating the fine bubble with the mixture gas containing the first gas and the second gas. Note that the present invention is not necessarily restricted to the specific principle described in the following sections (5) and (6).

(5) Potential Change on Fine Bubble Surface with First Gas

The first gas contained in the mixture gas is a basic gas which receives $H^+$ in an acid-base reaction. The first gas dissolves in water to generate $OH^-$. Specifically, a reaction of the following Formula 5-1 is caused.

$$X + H_2O \rightarrow XH^+ + OH^- \qquad \text{(Formula 5-1)}$$

Figure 9:
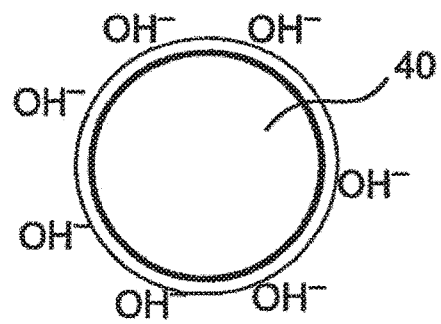
FIG. 9 is a schematic view for explaining a hypothetical principle of metal ion adsorption with an ion removal device according to embodiment 3.

In Formula 5-1, the first gas is represented by the chemical formula X. As a result of the reaction of Formula 5-1, a ratio of $OH^-$ around a fine bubble 40 increases compared to a ratio of $H^+$ as shown in FIG. 9 (illustration of $H^+$ is omitted in FIG. 9). A potential of the solid-liquid interface strongly depends on pH of the water quality because $H^+/OH^-$ in water is a potential-determining ion. When $H^+$ increases, the positive charge becomes higher, and when $OH^-$ increases, the negative charge becomes higher. Thereby, the negative charge on the fine bubble 40 becomes higher, and the positively charged $Ca^{2+}$ becomes easy to adsorb. In this manner, the effect of adsorbing the metal ions to the fine bubble can be improved.

Furthermore, in embodiment 3, ammonia which is a basic gas is used as the first gas. When using ammonia, the above Formula 5 is embodied in the following Formula 6.

$$NH_3 + H_2O \rightarrow NH_4 + OH^- \qquad \text{(Formula 6)}$$

As a result of generating the fine bubble 40 using ammonia which has a high aqueous solubility and is a general-purpose gas, a cost for generating the fine bubble 40 can be reduced while improving the aforementioned metal ion adsorption effect.

Incidentally, the aforementioned principle is not limited to ammonia, and possibly any basic gas is also applicable. Examples of such a basic gas include methylamine, ethylamine, propylamine, isopropylamine, butylamine, hexylamine, cyclohexylamine, dimethylamine, diethylamine, diisopropylamine, dipropylamine, di-n-butylamine, ethanolamine, diethylethanolamine, dimethylethanolamine, ethylenediamine, dimethylaminopropylamine, N,N-dimethylethylamine, trimethylamine, triethylamine, tetramethylenediamine, diethylenetriamine, propyleneimine, pentamethylenediamine, hexamethylenediamine, morpholine, N-methylmorpholine, and N-ethylmorpholine.

In addition, as shown in Formula 5-1, X is not limited to the basic gas, and it is considered that any "hydroxyl ion-donating gas" which reacts with water ($H_2$) to donate hydroxyl ion ($OH^-$) exhibits the same effect. An example of the hydroxyl ion-donating gas is a soluble ozone gas ($O_3$). It is considered that when the ozone gas is supplied to water, a reaction represented by the following Formula 5-2 similar to the above Formula 5-1 is caused.

$$O_3 + H_2O + 2e^- \rightarrow O_2 + 2OH^- \qquad \text{(Formula 5-2)}$$

It is considered that, according to the above Formula 5-2, the hydroxyl ion-donating gas "X" capable of causing the reaction represented by the following Formula 5-3 also exhibits the same effect.

$$XO + H_2O + 2e^- \rightarrow + X + 2OH^- \qquad \text{(Formula 5-3)}$$

Ozone will be explained in Experimental example 6.

(6) Retention of Fine Bubble with Second Gas

As explained in the above section "(5) Potential Change on Fine Bubble Surface with First Gas", the first gas as the basic gas contained in the mixture gas dissolves in water to increase a ratio of OH⁻ on the surface of the fine bubble 40. Such a first gas is mixed with the second gas having a slower solution velocity than of the first gas. As a result of mixing such a second gas, the whole fine bubble 40 is prevented from dissolving in water even when the first gas is dissolved in water, and the state of the fine bubble 40 can be retained. The effect of adsorbing $Ca^{2+}$ ions resulting from the fine bubble explained in embodiments 1 and 2 can be retained by retaining the state of the fine bubble 40.

In embodiment 3, nitrogen is used as the second gas. The fine bubble is generated using a general purpose gas nitrogen which is harmless to human bodies, so that a cost for generating the fine bubble 40 can be reduced while securing the safety. In addition, since nitrogen is a non-water soluble gas (non-soluble gas), the effect of maintaining the state of the fine bubble 40 can be more effectively exhibited.

The aforementioned principle is not limited to nitrogen, and possibly any gas having a slower solution velocity compared to that of the first gas as the basic gas is also applicable. When the second gas is selected, a gas having a slower (lower) water solution velocity (solubility) than of the first gas under the same conditions including the temperature and the pressure may be selected. Examples of such a second gas include, in ascending order of solubility, nitrogen, hydrogen, carbon monoxide, butane, oxygen, methane, propane, ethane, nitrogen monoxide, ethylene, propene, acetylene, and carbon dioxide. Above all, when the non-water soluble gas such as nitrogen monoxide, oxygen, and hydrogen is used, the effect of maintaining the state of the fine bubble 40 can be more effectively exhibited.

Figure 7:
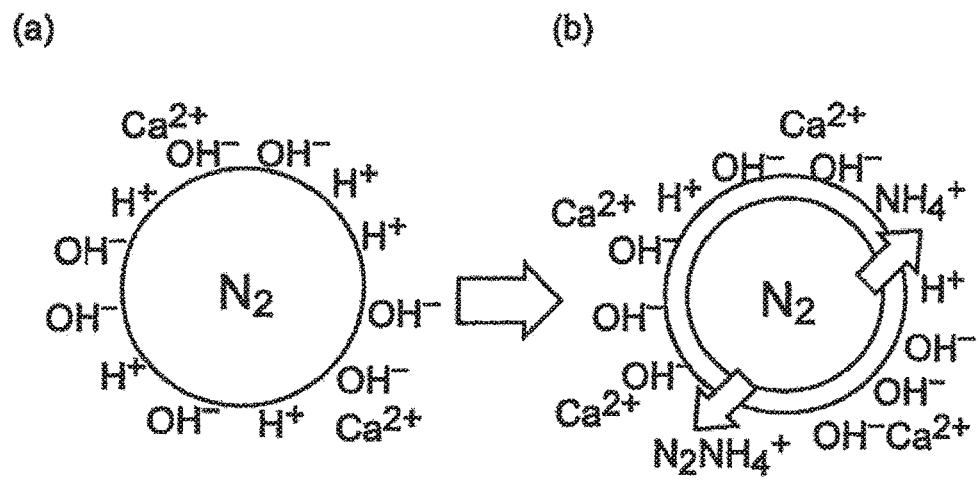
FIG. 7 is a schematic view for explaining a hypothetical principle of metal ion adsorption with an ion removal device according to embodiment 2.

Incidentally, dissolution of nitrogen in hard water was explained was explained with reference to FIGS. 7 and 8 in the sections "(3) Enhancement of Metal Ion Adsorption" and "(4) Enhancement of Metal Ion Crystallization", and it is considered that these reactions are also caused at the same time. Nitrogen hardly dissolves in water because it is water-insoluble, and strongly exerts an action of retaining the state of the fine bubble 40, but there is not a little water-soluble nitrogen. Thus, not a few phenomena of nitrogen dissolved in water as explained in the sections "(3) Enhancement of Metal Ion Adsorption" and "(4) Enhancement of Metal Ion Crystallization" are considered to also simultaneously occur with the phenomena of nitrogen retaining the fine bubble explained in the section "(6) Retention of Fine Bubble with Second Gas".

As described above, the fine bubble generator according to embodiment 3 generates the fine bubble 40 with the mixture gas of the first gas configured to react with water to donate hydroxyl ions and the second gas having a slower solution velocity compared to the first gas. The first gas which is a hydroxyl ion-donating gas reacts with water to increase the ratio of OH⁻ on the surface of the fine bubble 40. Thereby, the effect of adsorbing metal ions such as $Ca^{2+}$ to the fine bubble 40 can be increased. Furthermore, the second gas having a slower solution velocity compared to the first gas is mixed to prevent the fine bubble 40 from completely dissolving in water and retain the state of the fine bubble 40.

In embodiment 3, the first gas is a soluble basic gas (ammonia). In this manner, the first gas as the basic gas is first dissolved in water, and the second gas having a slower solution velocity compared to the basic gas is negatively charged, so that the aforementioned effect can be exhibited by utilizing the difference in the solution velocity between two gases.

Although the mixing ratio of ammonia and nitrogen on the fine bubble 40 may be set to any value, and for example, set so that a mixing ratio of nitrogen to ammonia is high (e.g. a ratio (volume ratio) of ammonia:nitrogen is 1:99). As a result of such a setting, an area where OH⁻ increases by dissolution of ammonia resides only as far as the vicinity of the surface of the fine bubble 40, and the OH ratio hardly changes at a position away from the fine bubble 40. In this manner, the water quality of the whole water can be prevented from changing while changing while changing only the vicinity of the surface of the fine bubble 40. On the other hand, the state of the fine bubble 40 can be maintained longer by increasing the ratio of nitrogen. In this manner, in the mixture gas, these effects can be exhibited by setting the quantity of the second gas having a slower solution velocity than of the basic gas so as to be larger than the quantity of the first gas as the basic gas. Note that, since the quantity is proportional to the volume under the same temperature and pressure conditions, either the quantity or the volume may be used to set the mixing ratio of the first gas and the second gas.

Alternatively, the mixing ratio may be set so that the ratio of ammonia to nitrogen is high. As a result of such a setting, the metal ion contained in hard water can be further crystallized and removed. Such a principle of crystallization enhancement will be explained in Experimental example 2-4.

Unlike the supplying configuration that ammonia and nitrogen are separately formed into fine bubble and separately supplied to hard water without mixing them, the fine bubble generator according to embodiment 3 is intended to supply the fine bubble 40 with the mixture gas of ammonia and nitrogen to hard water. According to such a supply method, ammonia is prevented from dissolving alone at a position away from the fine bubble 40, and therefore a function of increasing OH⁻ only in the vicinity of the surface of the fine bubble 40 can be sufficiently exhibited.

Next, the metal ion adsorbing effect of the fine bubble 40 with the mixture gas of ammonia as the first gas and nitrogen as the second gas, particularly the hypothetical principle to finally crystallize the metal ions will be explained with reference to the schematic drawing of FIG. 10.

Figure 10:
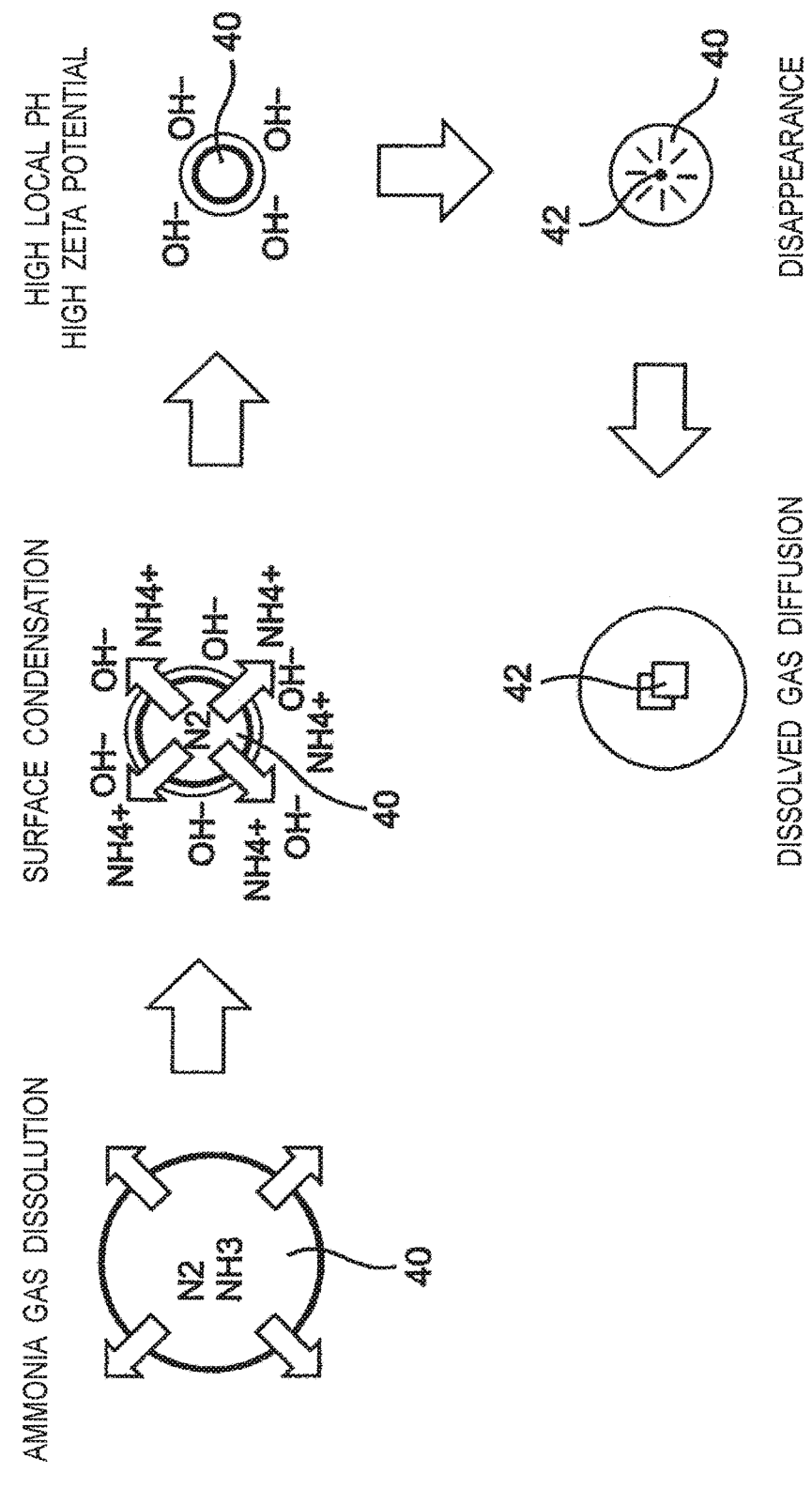
FIG. 10 is a schematic view for explaining a hypothetical principle of metal ion adsorption and crystallization with the ion removal device according to embodiment 3.

As shown in FIG. 10, once the fine bubble 40 is supplied into hard water, the water-soluble ammonia out of ammonia and nitrogen constituting the fine bubble 40 dissolves in the surrounding water (ammonia gas dissolution). Thereby, as explained in the section "(5) Potential Change on Fine Bubble Surface with First Gas", $NH_4^+$ is generated on the surface of the fine bubble 40 and the ratio of OH⁻ increases (surface condensation). At this time, the $Ca^{2+}$ ion adsorption effect increases.

As the surface condensation further progresses, the concentration of OH on the surface of the fine bubble 40 becomes maximum. That is, a pH on the surface of the fine bubble 40 becomes maximum, and a zeta potential of the fine bubble 40 becomes maximum (the local pH is high, and the zeta potential is high).

In the aforementioned states "ammonia gas dissolution", "surface condensation", and "high local pH and high zeta potential", $Ca^{2+}$ is adsorbed to the fine bubble 40. At this time, the fine bubble 40 adsorbing $Ca^{2+}$ can be separated from hard water to remove the metal ions from hard water.

When the separation has not been carried out, or when the separation has been carried out but some bubbles remain as the fine bubble 40, the $Ca^{2+}$ adsorbed to the surface of the fine bubble 40 starts to crystallize. Specifically, $Ca^{2+}$ crystallizes and precipitates as a crystal 42. Furthermore, the fine bubble starts to disappear (disappearance) along with precipitation of the crystal 42.

As the crystallization of $Ca^{2+}$ and the disappearance of the fine bubble 40 progress, the non-water soluble nitrogen maintaining the state of the fine bubble diffuses as a dissolved gas into water (dissolved gas diffusion).

In the aforementioned states "disappearance" and "dissolved gas diffusion", ions contained as metal ions in hard water precipitate as the crystal 42. The crystal 42 precipitated in such a way can be separated from hard water to crystallize and remove the metal ions in hard water.

Experimental Example 2-4

Next, Experimental example 2-4 will be explained for confirming influence of the mixing ratio of ammonia and nitrogen in the fine bubble 40 on the metal component crystallization. The experiments were carried out using a device 50 shown in FIG. 11.

Figure 11:
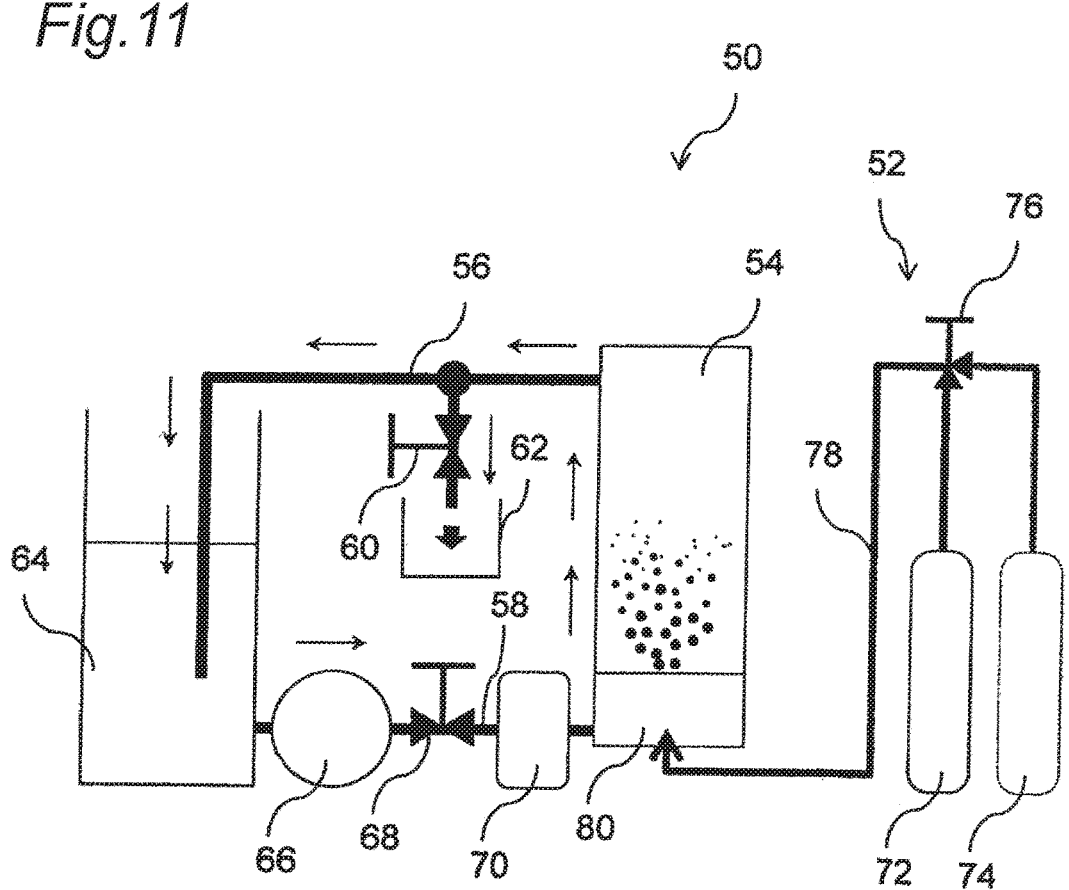
FIG. 11 is a view showing a schematic configuration of a device used in experimental examples 2 to 4.

FIG. 11 presents a schematic configuration of the device 50 used in Experimental example 2-4. The device 50 shown in FIG. 11 includes a mixture gas supply section 52, a treatment tank 54, a first pipe 56, a second pipe 58, a water collection valve 60, a water collector 62, and a water storage tank 64, a pump 66, a flow regulation valve 68, and a flowmeter 70.

The mixture gas supply section 52 refers to a member for supplying a mixture gas to the treatment tank 54. The mixture gas supply section 52 includes an ammonia supply source 72, a nitrogen supply source 74, a mixing ratio regulation valve 76, a supply pipe 78, and a fine bubble generator 80.

The mixture gas supply section 52 generates a mixture gas, which is prepared by mixing ammonia (first gas) and nitrogen (second gas) using the ammonia supply source 72 and the nitrogen supply source 74. The mixing ratio of ammonia and nitrogen can be set to any ratio by the mixing ratio regulation valve 76. The mixture gas is supplied to the fine bubble generator 80 disposed on the bottom portion of the treatment tank 54 through the supply pipe 78. The fine bubble generator 80 refers to a member for forming the mixture gas into fine bubble.

The treatment tank 54 refers to a tank for storing hard water as water to be treated (hard water storage section). Based on the principle explained in embodiment 3, the metal components are removed, particularly crystallized from hard water by supplying fine bubble with the mixture gas into hard water in the treatment tank 54. The treated water is sent to the first pipe 56. The water collection valve 60 is disposed on the way of the first pipe 56. The treated water passing through the first pipe 56 is collected by opening and closing the water collection valve 60. The collected treated water is put into the water collector 62.

The first pipe 56 is connected to the water storage tank 64. The water storage tank 64 refers to a tank for storing the treated water. The treated water stored in the water storage tank 64 is returned to the treatment tank 54 through the second pipe 58. Thereby, the treated water circulates.

The second pipe 58 is equipped with the pump 66, the flow regulation valve 68, and the flowmeter 70. The pump 66 refers to a member for generating a propulsive force for making the treated water in the water storage tank 64 flow through the second pipe 58. The flow regulation valve 68 refers to a valve for regulating the flow rate of the treated water passing through the second pipe 58. The flowmeter 70 refers to an apparatus for measuring the flow rate of the treated water flowing through the second pipe 58.

Various parameters were measured in such a way that the metal components in hard water were removed in the treatment tank 54 while continuously operating the pump 66 using this device 50, and the treated water was collected from the water collector 62. In Experimental example 2-4, a ratio of the crystallized metal components contained in the treated water (crystallization ratio) was investigated. Note that the "crystallization ratio" in the present specification means not only a ratio of a crystal configured so that atoms and molecules are periodically arranged with regularity but also a ratio of a mere substance precipitated as a solid. The crystallization ratio may be referred to as "precipitation ratio".

Figure 12:
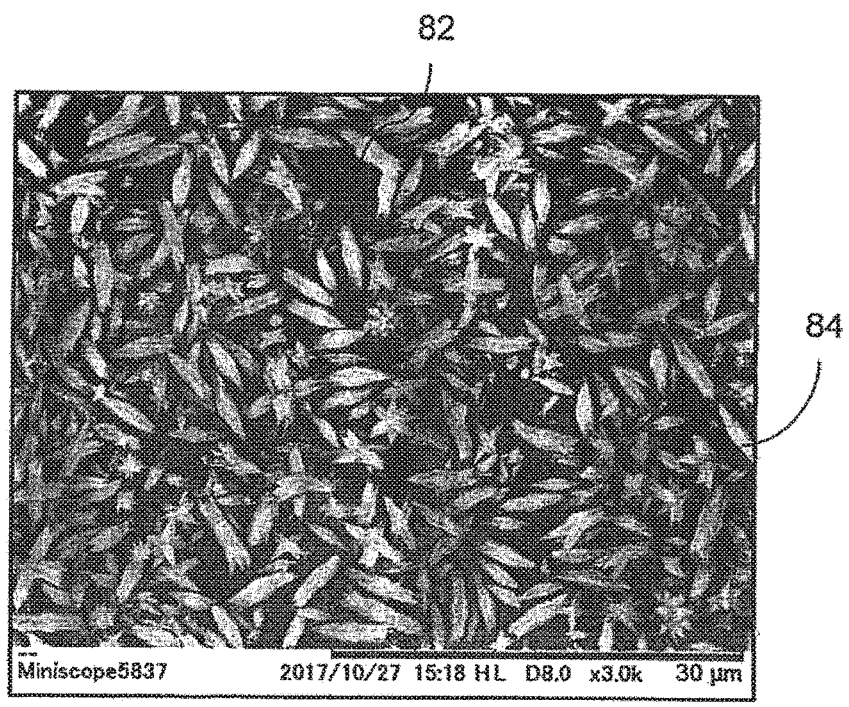
FIG. 12 is a view showing a state of metal components crystallized in hard water.

FIG. 12 presents an example of a result of observing water actually treated in Experimental example 2-4 by a scanning electron microscope (SEM). As shown in FIG. 12, a lot of crystals 84 precipitate in a treated water 82.

In examples 2 and 3, a hard water 1 was used as water to be treated. The hard water 1 is Evian (registered trademark) having a hardness of about 300 mg/L. In Experimental example 4, two types of waters, the hard water 1 and a hard water 2 were used. The hard water 2 is Contrex (registered trademark) having a hardness of about 1400 mg/L.

Experimental Example 2

In Experimental example 2, the treated water after a predetermined time had elapsed was collected as a sample water by the water collector 62 while flowing hard water into the treatment tank 54 by operating the pump 66 using the device 50. In Experimental example 2, the mixing ratio of ammonia and nitrogen in the mixture gas was varied to investigate difference in the crystallization ratio at each mixing ratio. Specific experimental conditions of Experimental example 2 will be described below. In Experimental example 2, all the treated water supplied from the treatment tank 54 to the first pipe 56 was discarded except water collected by the water collector 62, and was not supplied to water storage tank 64.

(Experimental Condition)
    Type of water to be treated: Hard water 1
    Mixing ratio of ammonia in mixture gas: 0% (nitrogen only)
        30%, 40%, 50%,
        60%, 70%, 80%,
        90%, 100% (ammonia only)
    Flow rate of water to be treated: 2.6 L/min
    Flow rate of mixture gas: 0.03 L/min
    Time from pump operation to collection: 3 minutes
    Measurement items of sample water: pH, Ca hardness (mg/L), total carbonate concentration (mg/L)

The measurement items of the sample water were measured using water from which crystal of metal component precipitated in the sample water were removed by filtering the collected sample water. The Ca hardness refers to a value obtained by converting the $Ca^{2+}$ content in the treated water per unit volume into calcium carbonate ($CaCO_3$). For measuring pH, Ca hardness, and total carbonate concentration, each commercially available measuring apparatus was used.

Figure 13A:
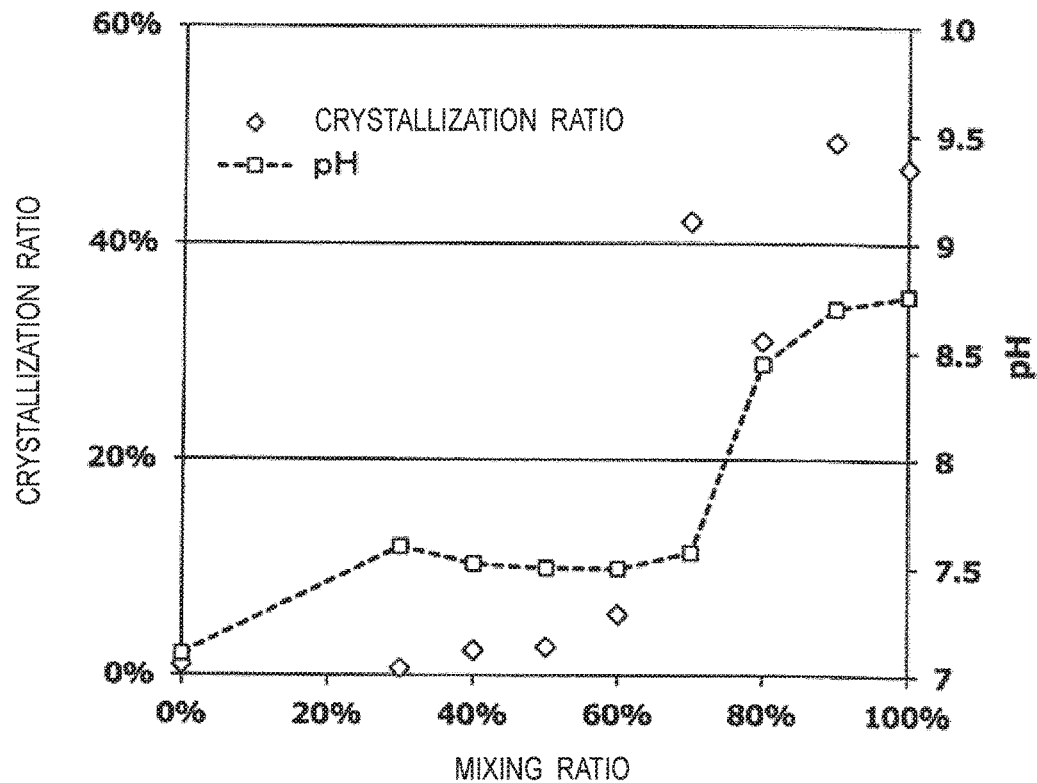
FIG. 13A is a graph showing results of experimental example 2, showing the relationship between the mixing ratio of ammonia and the crystallization ratio of sample water.
Figure 13B:
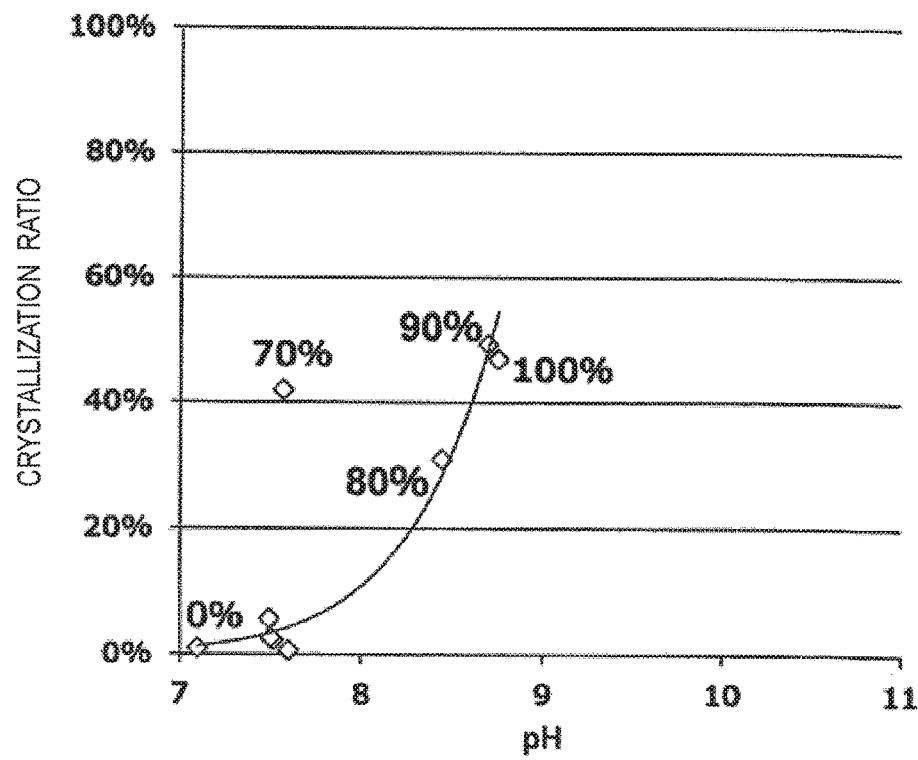
FIG. 13B is a graph showing results of experimental example 2, showing the relationship between the pH of sample water and the crystallization ratio of the sample water.

FIG. 13A and FIG. 13B present experimental results in Experimental example 2.

In FIG. 13A, the abscissa represents the mixing ratio (%) of ammonia in the mixture gas, and the ordinate represents the crystallization ratio (%) of the sample water. In FIG.

13B, the abscissa represents the pH of the sample water, and the ordinate represents the crystallization ratio (%) of the sample water.

The "crystallization ratio" was calculated by an equation (Ca hardness of sample water before operation—Ca hardness of sample water after operation)/Ca hardness of sample water before operation. The crystallization ratio calculated in such a way expresses how much metal ion has crystallized per unit volume of the sample water. The higher crystallization ratio expresses that more metal ion is crystallized from the sample water.

FIGS. 13A and 13B show that the higher the mixing ratio of ammonia is, the higher the crystallization ratio is. In particular, when the mixing ratio of ammonia is 70% or higher, the crystallization ratio dramatically increases.

FIGS. 13A and 13B show that the higher the mixing ratio of ammonia is, the higher the pH is. However, although the pH increases, the value shifts between at most 8.5 and 9. The pH reference value of tap water defined by the Ministry of Health, Labor and Welfare ranges 5.8 to 8.6, and it can be seen that even when the mixing ratio of ammonia is high, the pH value shifts in a range close to the range of the tap water. A desirable pH range of alkaline ionized water for drinking defined in Act on Securing Quality, Efficacy and Safety of Products Including Pharmaceuticals and Medical Devices is pH 9 to 10. Since the pH value can be suppressed lower than this range, the sample water is proved to be suitable also as drinking water.

It is considered that the reason why increase in pH does not excessively rise even when the mixing ratio of ammonia is high is because not the pH of the whole treated water but rather the pH at the local area around the fine bubble 40 is primarily raised, as explained with reference to FIG. 10.

Experimental Example 3

In Experimental example 3, like Experimental example 2, the treated water after a predetermined time had elapsed was collected as a sample water by the water collector 62 while flowing hard water into the treatment tank 54 by operating the pump 66 using the device 50. In Experimental example 3, only two patterns of ammonia mixing ratios 70% and 100% in the mixture gas were used. In addition, unlike Experimental example 2, the sample water was collected at predetermined intervals from the operation of the pump 66 to measure various parameters. Furthermore, unlike Experimental example 2, all the treated water supplied from the treatment tank 54 to the first pipe 56 was returned to the water storage tank 64 except water collected by the water collector 62, and was circulated. Specific experimental conditions of Experimental example 3 will be described below.
(Experimental Condition)
  Type of water to be treated: Hard water 1
  Mixing ratio of ammonia in mixture gas: 70%, 100% (only ammonia)
  Flow rate of water to be treated: 2.6 L/min
  Flow rate of mixture gas: 0.03 L/min
  Measurement items of sample water: pH, Ca hardness (mg/L), total carbonate concentration (mg/L)

Figure 14A:
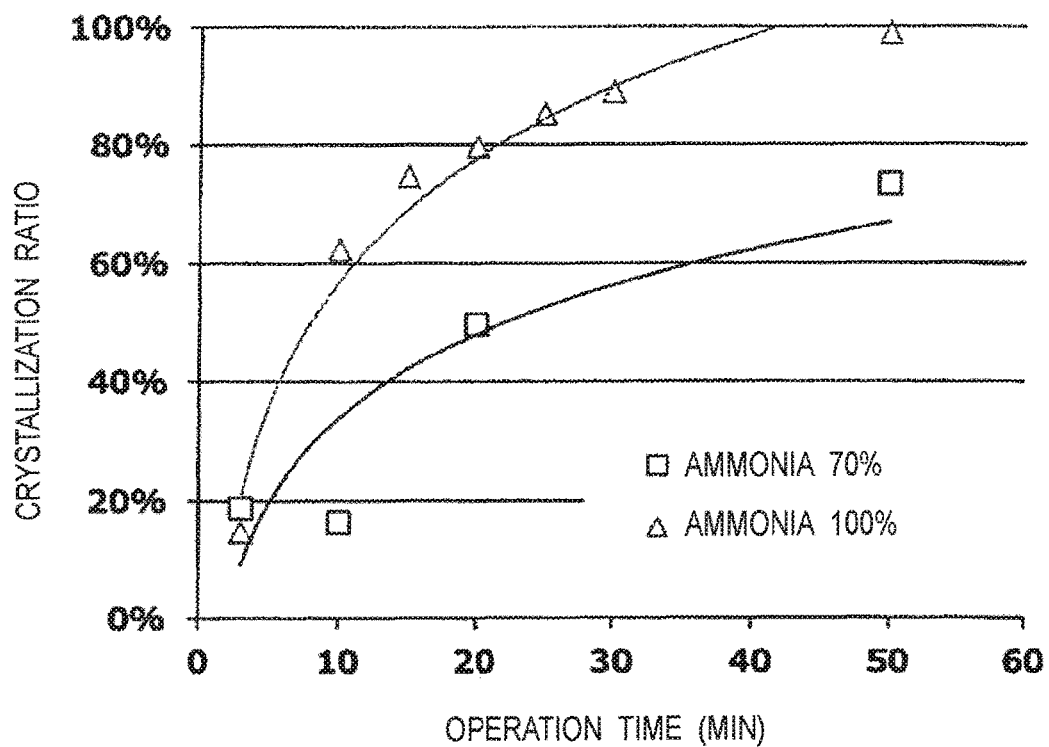
FIG. 14A is a graph showing results of experimental example 3, showing the relationship between the operating time of a pump and the crystallization ratio of sample water.
Figure 14B:
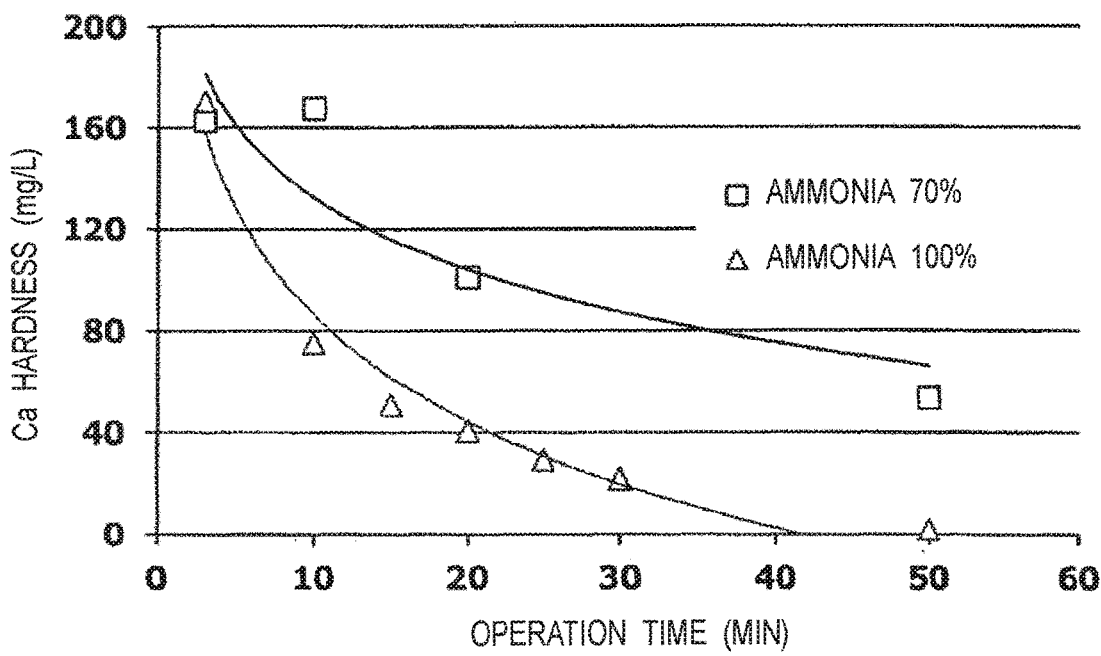
FIG. 14B is a graph showing results of experimental example 3, showing the relationship between the operating time of the pump and the Ca hardness of the sample water.
Figure 14C:
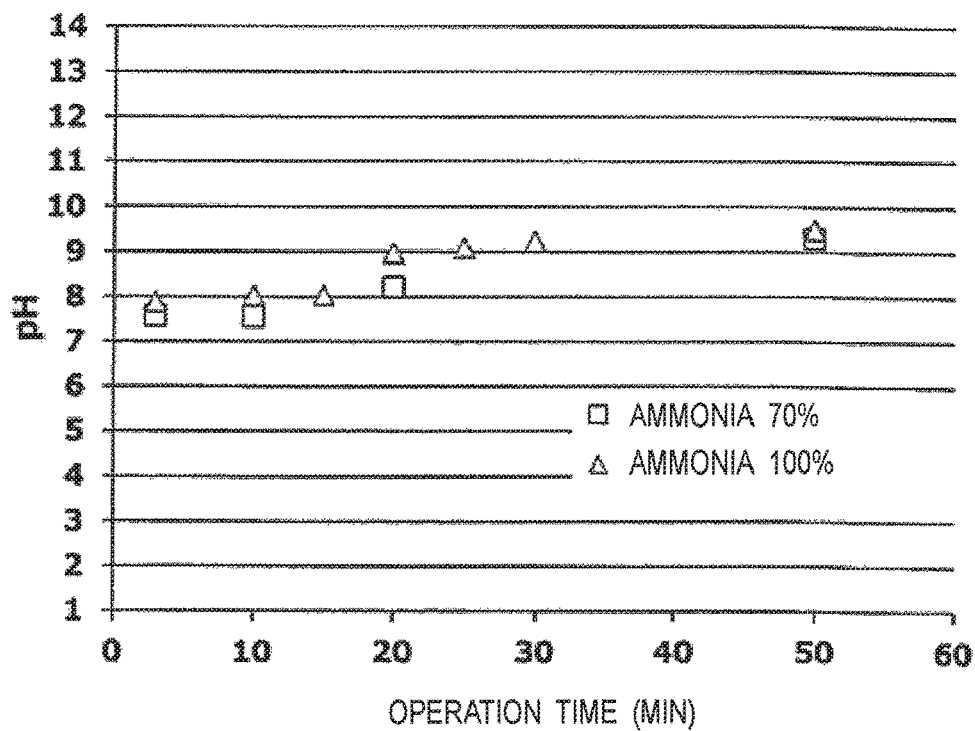
FIG. 14C is a graph showing results of experimental example 3, showing the relationship between the operating time of the pump and the pH of the sample water.

FIG. 14A, FIG. 14B, and FIG. 14C present experimental results in Experimental example 3.

In FIG. 14A, the abscissa represents the operation time (minute) of the pump 66, and the ordinate represents the crystallization ratio (%) of the sample water. In FIG. 14B, the abscissa represents the operation time (minute) of the pump 66, and the ordinate represents the Ca hardness (mg/L) of the sample water. In FIG. 14C, the abscissa represents the operation time (minute) of the pump 66, and the ordinate represents the pH of the sample water.

As shown in FIG. 14A, in both cases of the ammonia mixing ratios of 70% and 100%, the crystallization ratio increases as the operation time passes. In addition, the Ca hardness decreases as the operation time passes, as shown in FIG. 14B. This reveals that $Ca^{2+}$ of the metal components dissolved in hard water is crystallized as $CaCO_3$ by introducing the fine bubble with the mixture gas.

On the other hand, in the case of the ammonia mixing ratio of 100% rather than the case of 70%, the increasing rate of the crystallization ratio and the decreasing rate of the Ca hardness are enhanced. This reveals that ammonia significantly contributes to the crystallization of $Ca^{2+}$ into $CaCO^3$.

As shown in FIG. 14C, in both cases of the ammonia mixing ratios of 70% and 100%, the pH loosely increases as the operation time passes. There is not so significant difference in the pH between the cases of the ammonia mixing ratios of 70% and 100%. Also, even after 50 minutes has passed from the start of the operation, the pH is between 9 and 10 and does not excessively increases. It is considered that the reason why the increasing rate of the pH does not so excessively increase as described above is because not the pH of the whole treated water but rather the pH at the local area around the fine bubble 40 is primarily raised, as explained with reference to FIG. 10.

Experimental Example 4

In Experimental example 4, like examples 2 and 3, the treated water after a predetermined time had elapsed was collected as a sample water by the water collector 62 while flowing hard water into the treatment tank 54 by operating the pump 66 using the device 50. In the same manner as in Experimental example 3, the sample water was collected at predetermined intervals from the operation of the pump 66 to measure various parameters. In the same manner as in Experimental example 3, all the treated water supplied from the treatment tank 54 to the first pipe 56 was returned to the water storage tank 64 except water collected by the water collector 62, and was circulated. On the other hand, in Experimental example 4, only one pattern of ammonia mixing ratio 70% in the mixture gas was used. In addition, unlike examples 2 and 3, two types of hard water, hard water 1 (hardness: about 300 mg/L) and hard water 2 (hardness: about 1400 mg/L) were used as the treated water. Specific experimental conditions of Experimental example 4 will be described below.
(Experimental Condition)
  Type of water to be treated: Hard water 1 and hard water 2
  Mixing ratio of ammonia in mixture gas: 70%
  Flow rate of water to be treated: 2.6 L/min
  Flow rate of mixture gas: 0.03 L/min
  Measurement items of sample water: pH, Ca hardness (mg/L), total carbonate concentration (mg/L)

FIG. 15A, FIG. 15B, FIG. 15C, and FIG. 15D present experimental results in Experimental example 4.

Figure 15A:
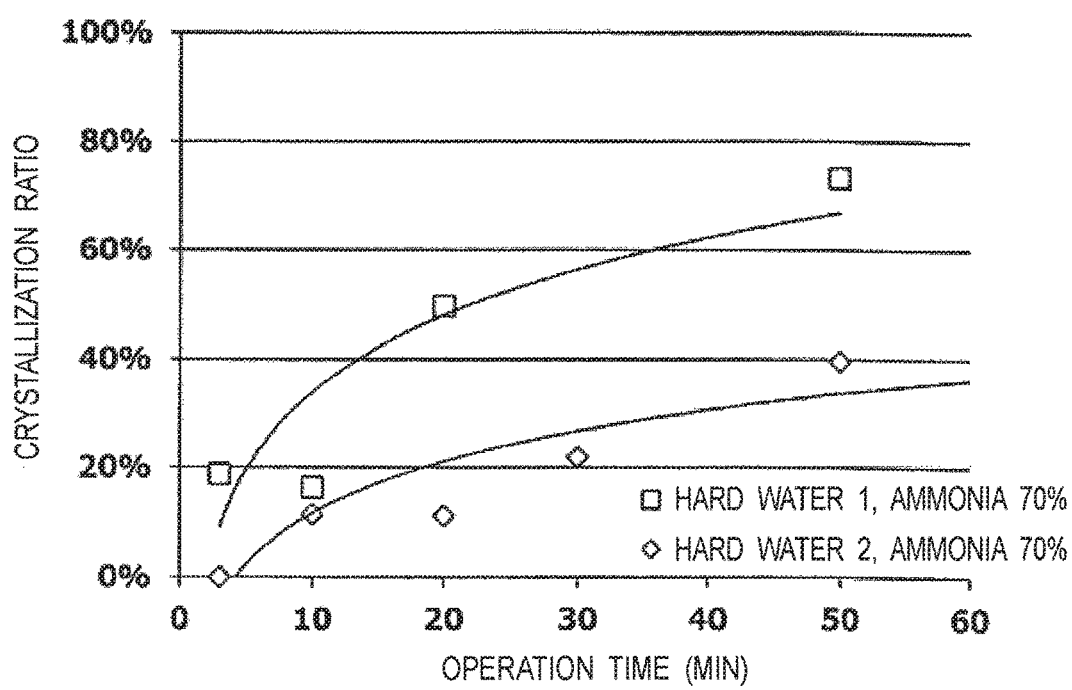
FIG. 15A is a graph showing results of experimental example 4, showing the relationship between the operating time of a pump and the crystallization ratio of sample water.
Figure 15B:
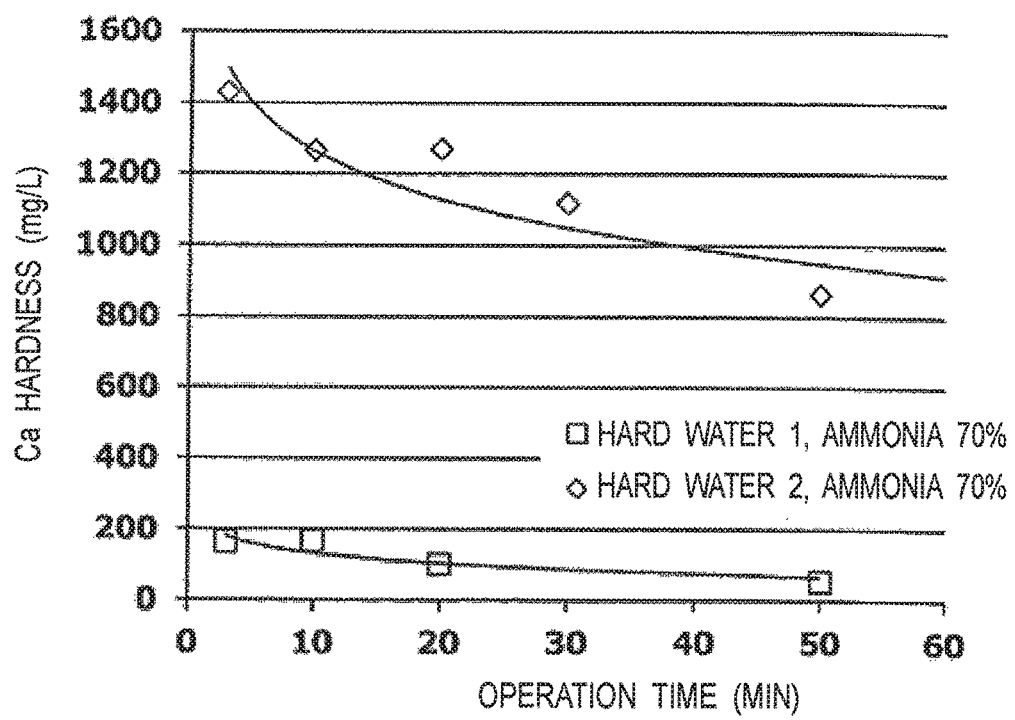
FIG. 15B is a graph showing results of experimental example 4, showing the relationship between the operating time of the pump and the Ca hardness of the sample water.
Figure 15C:
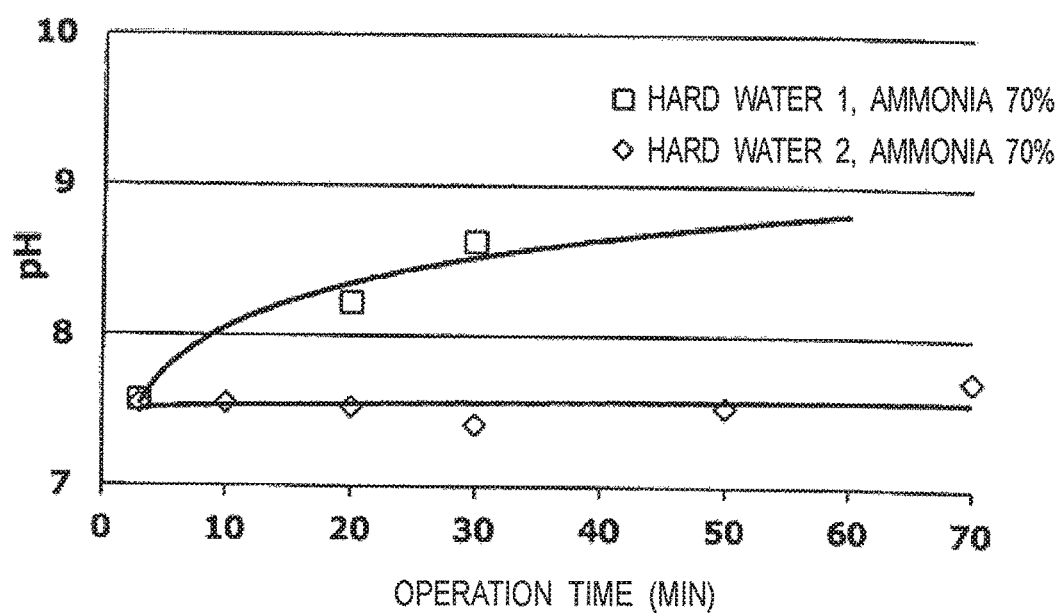
FIG. 15C is a graph showing results of experimental example 4, showing the relationship between the operating time of the pump and the pH of the sample water.
Figure 15D:
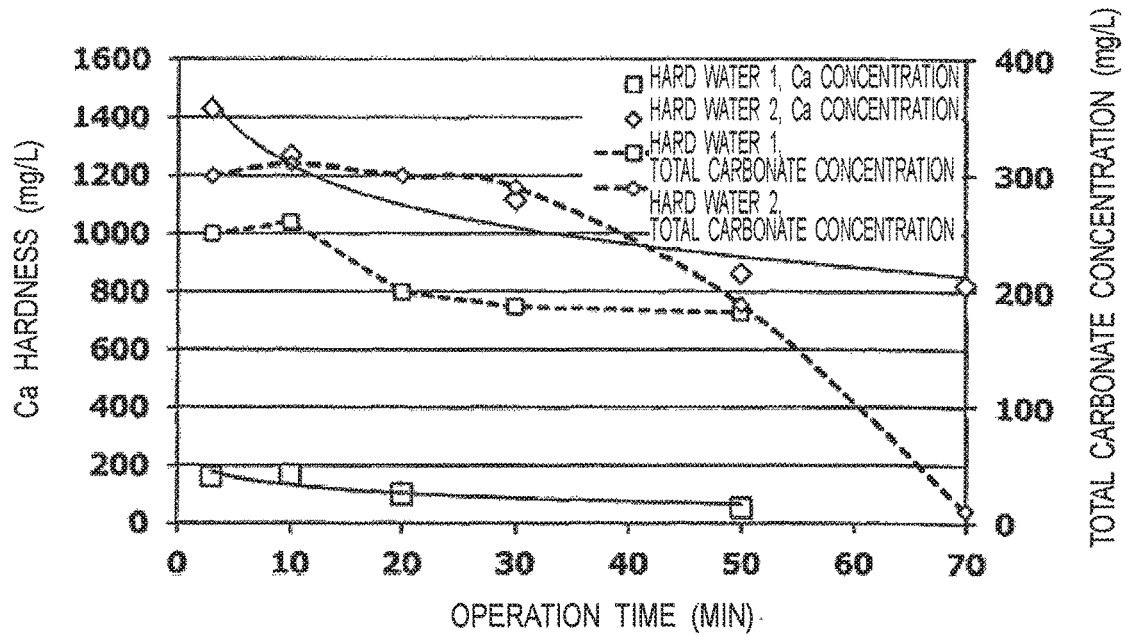
FIG. 15D is a graph showing results of experimental example 4, showing the relationship between the operating time of the pump and the Ca hardness and total carbonic acid concentration of the sample water.

In FIG. 15A, the abscissa represents the operation time (minute) of the pump 66, and the ordinate represents the crystallization ratio (%) of the sample water. In FIG. 15B, the abscissa represents the operation time (minute) of the pump 66, and the ordinate represents the Ca hardness (mg/L) of the sample water. In FIG. 15C, the abscissa represents the operation time (minute) of the pump 66, and the ordinate represents the pH of the sample water. FIG. 15D presents a graph of which the ordinate is added with the total carbonate concentration (mg/L) in the graph of FIG. 15B.

As shown in FIGS. 15A and 15B, in both the hard water 1 and the hard water 2, the crystallization ratio increases and the Ca hardness decreases as the operation time passes. This reveals that $Ca^{2+}$ of the metal components dissolved in hard water is crystallized as $CaCO_3$ by introducing the fine bubble with the mixture gas.

In addition, FIGS. 15A and 15C show that there are significant differences in the increasing rates of the crystallization ratio and the pH between the hard water 1 and the hard water 2. Specifically, it can be seen that the hard water 1 has higher increasing rates of the crystallization ratio and the pH than those of the hard water 2. In this regard, the inventors of the present invention focused on the "total carbonate concentration" and examined the "total carbonate concentration" based on the data shown in FIG. 15D.

As shown in FIG. 15D, a value of the total carbonate concentration in the hard water 1 is 150 to 200 mg/L when the operation time is 50 minutes. That is, the hard water 1 contains large amounts of $HCO_3^-$ and $CO_3^{2-}$. When the operation time is 50 minutes, the crystallization ratio of the hard water 1 reaches 70 to 80% as shown in FIG. 15A. On the other hand, a value of the total carbonate concentration in the hard water 2 is about 20 mg/L when the operation time is 70 minutes. Comparison with hard water 1 shows that the hard water 2 has considerably small amounts of $HCO_3^-$ and $CO_3^{2-}$. Incidentally, when the operation time is 70 minutes, the crystallization ratio of the hard water 2 is expected to be about 40% according to the data in FIG. 15A.

$HCO_3^-$ and $CO_3^{2-}$ function as components for crystallizing as $Ca^{2+}$ as $CaCO_3$, as explained for the principles of embodiments 1 to 3. Since the hard water 1 contains large amounts of $HCO_3^-$ and $CO_3^{2-}$, the hard water 1 is considered to have a higher increasing rate of the crystallization ratio than of the hard water 2.

The metal component content and the total carbonate concentrations in the hard waters 1 and 2 are shown in the following Table 1.

TABLE 1

|  | Content (mg/L) | | | $CO_3^{2-}$ content required for dissolution (mg/L) | | | Surplus amount |
| --- | --- | --- | --- | --- | --- | --- | --- |
|  | Ca | Mg | $CO_3^{2-}$ | Ca | Mg | Total | (mg/L) |
| Molecular weight | 40 | 24.3 | 60 |  | 60 |  |  |
| Contrex | 468 | 74.8 | 372 | 702 | 184.691358 | 886.691358 | −514.691 |
| Evian | 80 | 26 | 357 | 120 | 64.19753086 | 184.1975309 | 172.8025 |

As shown in Table 1, in Evian (registered trademark) as the hard water 1, the contents of Ca, Mg and $CO_3^{2-}$ per unit volume of Evian are 80, 26, and 357 mg/L respectively. In Contrex (registered trademark) as the hard water 2, the contents of Ca, Mg and $CO_3^{2-}$ per unit volume of Contrex are 468, 74.8, and 372 mg/L respectively. As described above, in the hard water 1 and hard water 2, the $CO_3^{2-}$ contents per unit volumes are 357 mg/L and 372 mg/L respectively, which are approximately equal to each other. On the other hand, the $CO_3^{2-}$ content required for dissolving Ca and Mg relative to the Ca and Mg content in hard water is about 184 mg/L in the hard water 1, and about 887 mg/L in the hard water 2. That is, in the hard water 1, the amount of the actually contained $CO_3^{2-}$ is in excessive by about 173 mg/L relative to the $CO_3^{2-}$ content required for dissolving Ca and Mg. This means that when introducing the mixture gas with the fine bubble, there is a plenty of $CO_3^{2-}$ for crystallizing $Ca^{2+}$. On the other hand, in the hard water 2, the amount of the actually contained $CO_3^{2-}$ is in shortage by about 515 mg/L relative to the $CO_3^{2-}$ content required for dissolving Ca and Mg. This means that when introducing the mixture gas with the fine bubble, there is a small amount of $CO_3^{2-}$ for crystallizing $Ca^{2+}$, and the crystallization is not enhanced.

From the above results, it is considered that when the hard water to be treated contains a plenty of carbonates such as $HCO_3^-$ and $CO_3^{2-}$, the increasing rate of the crystallization can be improved. For the purpose of increasing the total carbonate content in hard water based on this result, carbon dioxide gas may be introduced into hard water before the fine bubble is introduced. Specifically, a carbon dioxide gas generator for generating carbon dioxide gas may be further installed. In addition, carbon dioxide gas may be generated by the carbon dioxide gas generator and supplied to hard water before supplying the fine bubble generated by the fine bubble generator to hard water. It is considered that this process can enhance crystallization of the metal components in hard water.

As described above, according to Experimental example 2-4, crystallization of the metal components can be enhanced by setting the quantity of ammonia so as to be larger than the quantity of nitrogen in the mixture gas. Furthermore, crystallization of the metal components can be greatly enhanced by setting the mixing ratio of ammonia in the mixture gas to 70% or higher.

Experimental Example 5

Experimental example 5 includes a sensory evaluation experiment for evaluating "foaming" for the sample water (soft water) treated using the aforementioned device 50. The foaming is related to the foaming power depending on heights and sizes of the foam generated from the water surface. It is generally supposed that the smaller the amount of the hardness components is, the larger the foaming is, e.g. providing such an advantage that a washing effect is enhanced when the water is used for the purpose of washing.

In Experimental example 5, unlike Experimental example 2-4, fine bubble were produced originating from a single gas ammonia instead of the mixture gas. That is, in the device 50 shown in FIG. 11, fine bubble were produced using only an ammonia supply source 72 without using the nitrogen supply source 74. Since the method of using the device 50 is the same as in Experimental example 2-4, explanation of the method is omitted.

The experimental method of Experimental example 5 is based on the standard of "foaming": SHASE-S 218 of Society of Heating, Air-conditioning and Sanitary Engineers of Japan. Specifically, diluted water was prepared by diluting 1.5 g of pure soap with 200 ml of water, then 1 mL of the diluted water and 9 mL of water to be treated were mixed, and 10 mL of the mixture as an evaluation water was put into a measuring cylinder. As the pure soap, Cow brand red box a1 toilet soap (Cow Brand Soap Kyoshinsha Co., Ltd.) was used, and as 200 ml of water, distilled waterAutostil WG221 (Yamato Scientific co., ltd.) was used. The measuring cylinder was shaken 50 times, and after 1 minute, a height of the foam from the water surface was measured.

In Experimental example 5, the same experiment was performed using, in addition to the sample water treated by the device 50, three types of water, hard water, tap water, and pure water. Hardnesses of these waters and the sample water are as follows.

Figure 16:
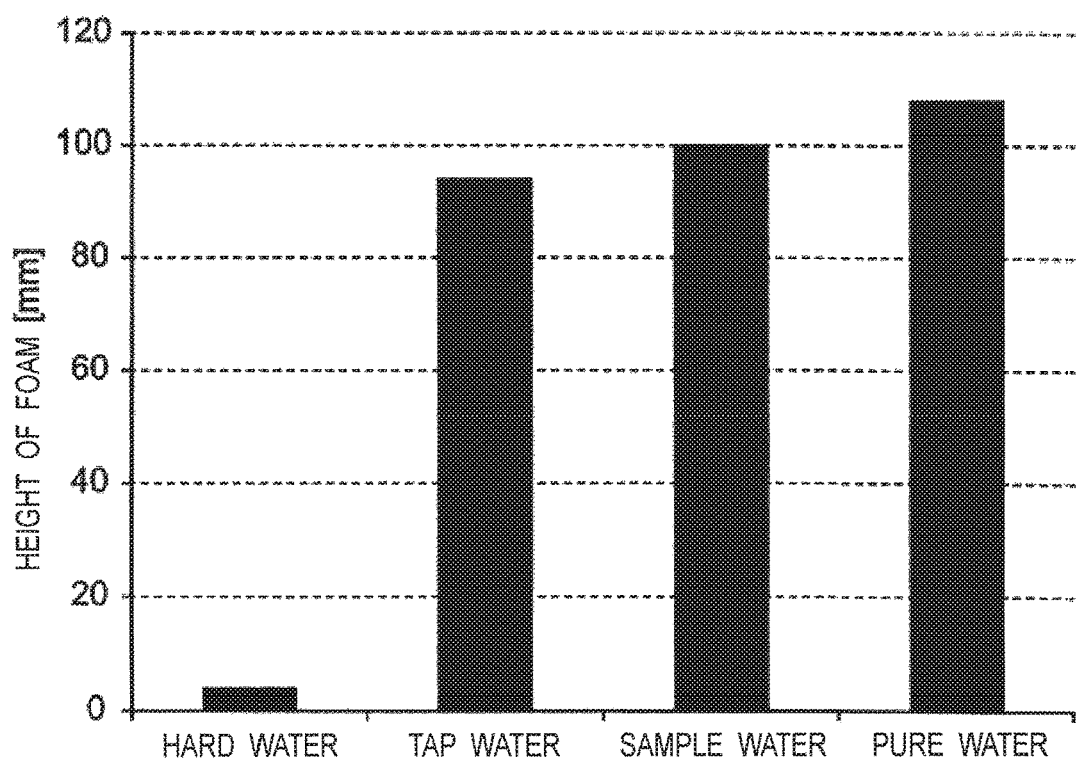
FIG. 16 is a graph showing results of experimental example 5, showing the relationship between the type of water and the height of a form extending from the water surface of evaluation water.

Hardness of hard water: Overall hardness is 300 mg/L, Ca hardness is 200 mg/L, Mg hardness is 100 mg/L Hardness of tap water: Overall hardness is 72 mg/L, Ca hardness is 49 mg/L, Mg hardness is 23 mg/L Hardness of pure water: Overall hardness is 0 mg/L, Ca hardness is 0 mg/L, Mg hardness is 0 mg/L Hardness of sample water: Overall hardness is 118 mg/L, Ca hardness is 21 mg/L, Mg hardness is 97 mg/L FIG. 16 presents experimental results in Experimental example 5. In FIG. 16, the abscissa represents the type of water, and the ordinate represents the height (mm) of the foam extending from the surface of the evaluation water. The ordinate represents foaming and foaming power.

As shown in FIG. 16, the "hard water" which was highest in both the Ca and Mg hardnesses showed almost no foaming and the hardnesses were close to 0, whereas the "tap water", "sample water" and "pure water" showed almost the same high foaming levels. That is, in the "sample water" treated using the device 50, the foaming is improved relative to the hard water before treatment and achieves foaming close to those of "tap water" and "pure water". This revealed that foaming could be improved by removing the metal ions from hard water using the method in embodiments, and foaming at the same level as of tap water and pure water as soft water could be achieved.

When comparing the results shown in FIG. 16 with the concrete values of the hardness, the lower the Ca hardness is, the higher the foaming level is. This reveals that the Mg hardness value rather than the Ca hardness value is a dominant parameter that directly affects foaming.

Experimental Example 6

In embodiment 6, the water to be treated (hard water) is treated using the same device 50 (FIG. 11) as in Experimental example 2-4, and the treated sample waters are compared for the crystallization ratio.

In Experimental example 6, the difference in the crystallization ratio was examined by comparing the crystallization ratios between the case using micro-bubbles as fine bubble and the case of using milli-bubbles as non-fine bubble. That is, in the device 50 shown in FIG. 11, an experiment was carried out in two patterns, a pattern using the fine bubble generation section 80 as it is to generate micro-bubbles, and a pattern using another bubble generation section (not shown) instead of the fine bubble generation section 80 to generate milli-bubbles.

In Experimental example 6, unlike Experimental example 2-4, furthermore bubbles were produced originating from a single gas ozone instead of the mixture gas. That is, in the device 50 shown in FIG. 11, an ozone supply source (not shown) was used instead of the ammonia supply source 72 and the nitrogen supply source 74. As explained in embodiment 3, the ozone gas is a hydroxyl ion-donating gas.

The experimental conditions of Experimental example 6 are as follows.

Type of water to be treated (common): Hard water 1
Flow rate of water to be treated (common): 12 L/min
Volume of water stored in the treatment tank 54 9 L (common):
Flow rate of ozone gas (common): 0.12 L/min
Average diameter of micro-bubbles: 56 μm
Average diameter of milli-bubbles: 1021 μm
Measurement items of sample water (common): Ca hardness (mg/L), overall hardness (mg/L)

Figure 17A:
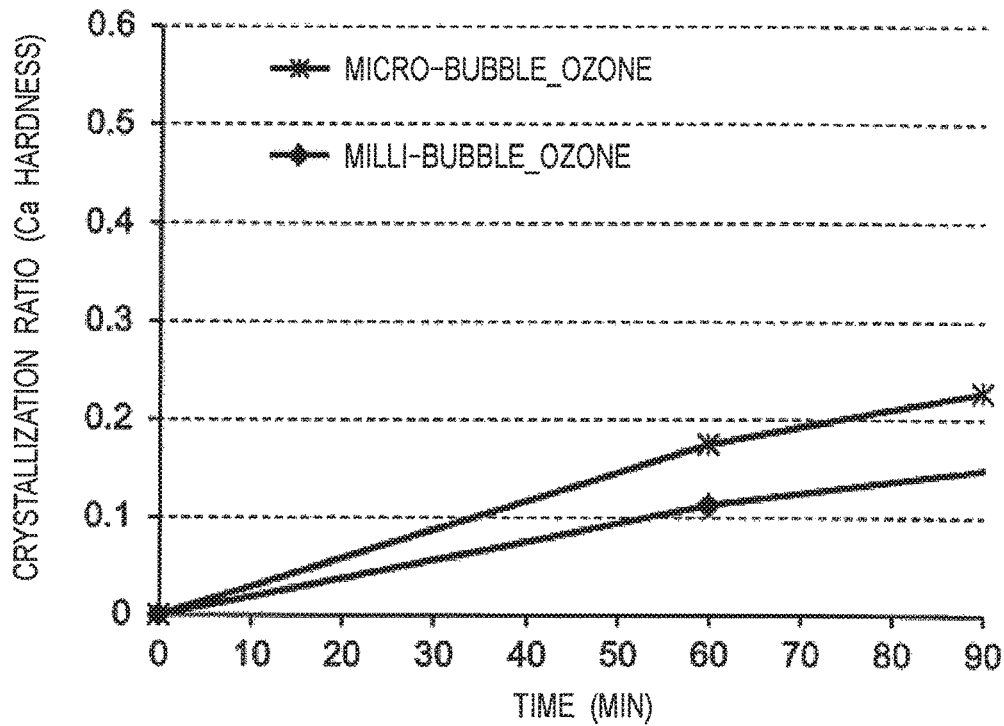
FIG. 17A is a graph showing results of experimental example 6, showing the relationship between time and the crystallization ratio of Ca hardness.
Figure 17B:
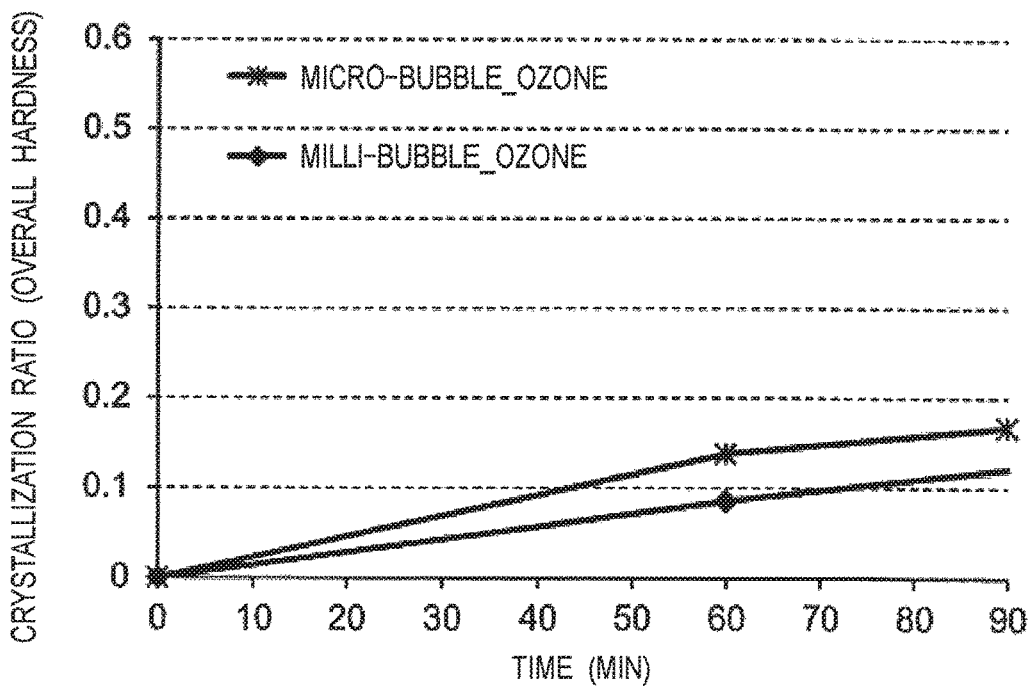
FIG. 17B is a graph showing results of experimental example 6, showing the relationship between time and the crystallization ratio of total hardness.

FIG. 17A and FIG. 17B present experimental results in Experimental example 6.

In FIG. 17A, the abscissa represents time (minute), and the ordinate represents the crystallization ratio (%) of the Ca hardness. In FIG. 17B, the abscissa represents time (minute), and the ordinate represents the crystallization ratio (%) of the overall hardness.

FIG. 17A and FIG. 17B reveal that both the Ca hardness and the overall hardness of the micro-bubbles achieve higher crystallization ratios than of the milli-bubbles. That is, it was demonstrated that the case using the micro-bubbles as fine bubble had a higher crystallization ratio than those in the case using the milli-bubbles as non-fine bubble, achieving the metal ion crystallization effect with fine bubble.

Not limited to the above-mentioned embodiments, the present invention can be implemented in various other modes. For example, although the metal ion is $Ca^{2+}$ and the particle is $CaCO_3$ in the above explanation, the present invention is not limited to such a case. When the metal ion is $Ca^{2+}$, the particle may be, not limited to $CaCO_3$, any particle containing Ca as a constituent element (e.g., calcium phosphate $(Ca_3(PO_4)_2)$). Furthermore, the metal ion is not limited to $Ca^{2+}$, and may be another metal ion (e.g., $Mg^{2+}$ or other Group 2 element).

In the above explanation, the particle feeder 102 is connected to the feeding points 108A, 110A, and 112A via the three flow paths 108, 110, and 112, respectively, but not limited thereto, the particle feeder 102 may be connected to other feeding point. If a feeding point is set upstream of the hard water storage 3A in the hard water flow direction or in the hard water storage 3A, the same effects as in embodiment 1 can be exhibited.

Furthermore, in the above explanation, the three flow paths 108, 110, and 112 and the three feeding points 108A, 110A, and 112A are provided, but not limited thereto, one of the flow paths and one of the feeding points may only be provided.

Figure 18:
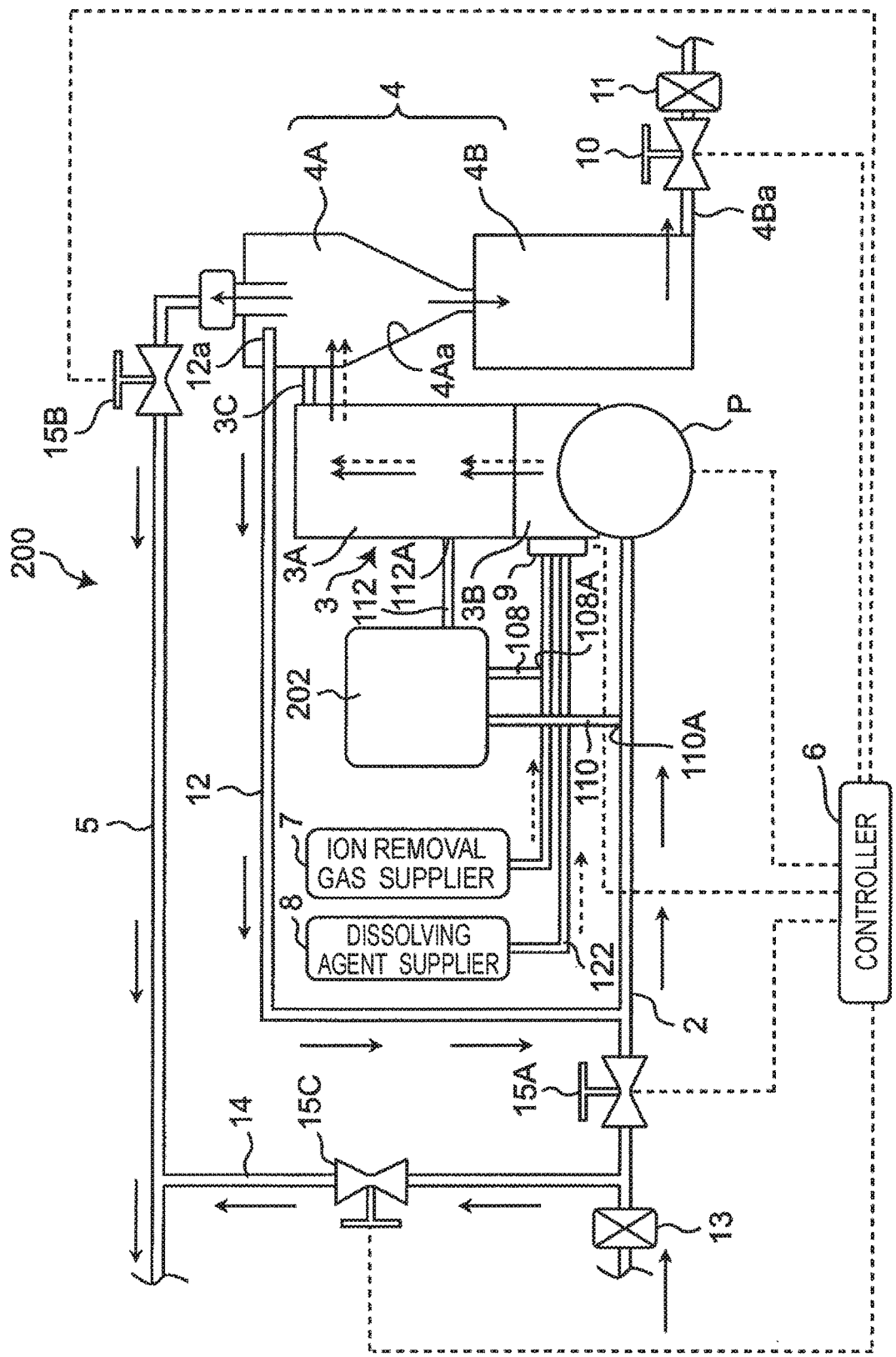
FIG. 18 is a schematic view of an ion removal device according to a variation of embodiment 1.

The particle feeder 102 includes the particle feeding mechanism 104 and the particle storage 106 in the above explanation, but the present invention is not limited thereto. For example, a particle feeder 202 as shown in FIG. 18 may be used. In an ion removal system 200 shown in FIG. 18, the particle feeder 202 itself is a device configured to generate a particle. Specifically, the particle feeder 202 is a reaction tank configured to causes a reaction to generate a particle. In such a case, a reaction using phosphoric acid, sodium hydrogen carbonate and the like as a raw material may be caused as shown in the following equation 7.

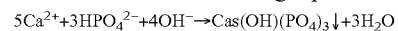

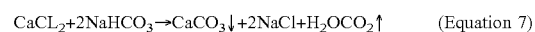  (Equation 7)

According to the embodiment shown in FIG. 18, the particle feeder 202 can have a simple configuration.

In the above description, air or nitrogen is used as the ion removal gas in the water-softening treatment, but the present invention is not limited thereto. A gas other than air and nitrogen may be used as the ion removal gas.

Furthermore, in the above explanation, carbon dioxide is used as the dissolving gas for performing the reproduction treatment, but the present invention is not limited thereto. For example, hydrogen sulfide ($H_2S \rightarrow H^+ + HS^-$) or hydrogen chloride ($HCL \rightarrow H^+ + CL^-$), which is a gas to produce a hydrogen ion when dissolved in water, may be used as the dissolving gas.

Furthermore, in the above description, the dissolving gas is used as an example of the dissolving agent for performing the reproduction treatment, but the present invention is not limited thereto. For example, a liquid (that is, "dissolving liquid") configured to dissolve the crystal of metal component may be used as the dissolving agent. Examples of such a liquid include hydrochloric acid, sulfuric acid, citric acid, and ascorbic acid. Using such a liquid can reduce the size of the dissolving agent supplier 8. Furthermore, the frequency of exchanging the dissolving agent can be reduced. When a liquid is used as the dissolving agent, it is possible to prevent gas from entering the pump P, thereby eliminating the need for disposing the dissolving agent supplier 8 downstream of the pump P in the flow direction of the hard water. That is, the dissolving agent supplier 8 may be disposed in the circulation flow path constituted by the primary flow path 2, the ion removal device 3, the separation device 4, and the return flow path 12. With this configuration, the dissolving agent can also be supplied to the separation device 4 to dissolve the crystal adhering to the separation device 4 for the reproduction treatment.

Furthermore, in the above description, only the fine bubble containing the ion removal gas is supplied into the hard water, but the present invention is not limited thereto. For example, other gas may be supplied into the hard water in addition to the fine bubble containing the ion removal gas. In this case, the other gas may be supplied to the hard water as a fine bubble or may be supplied to the hard water as a normal bubble.

Furthermore, in the above description, the opening/closing operations of the first valve 15A, the second valve 15B, and the third valve 15C are automatically controlled by the control unit 6, but the present invention is not limited thereto. The opening/closing operations of the first valve 15A, the second valve 15B, and the third valve 15c may be performed manually.

Additionally, in the above description, the fine bubble including the mixed two gases with the first gas as a basic gas and the second gas having a slower solution velocity than the first gas is used, other gas may be mixed in addition to these two gases. That is, a fine bubble with a mixed gas of two or more types of gases including the first and second gases may be used.

Incidentally, among the various embodiments and variations, any embodiments can be appropriately combined to exhibit each effect of each embodiment.

The present disclosure has been sufficiently described in connection with the preferable embodiments with reference to the appended drawings, but various variations and modifications are obvious to those skilled in the art. Such variations and modifications should be understood as included within the scope of the present disclosure according to the appended claims without departing from the scope. In addition, changes in the combination or the order of the elements in each embodiment can be achieved without departing from the scope and the spirit of the present disclosure.

INDUSTRIAL APPLICABILITY

Since the ion removal system according to the present invention has better maintainability and environmental property, it is useful for both an ion removal system for home and an ion removal system for business.

DESCRIPTION OF REFERENCE SIGNS

1 Ion removal system
2 Primary flow path
3 Ion removal device
3A Hard water storage
3B Fine bubble generator
3C Connection flow path
4 Separation device
4A Separation section
4Aa Inner peripheral surface
4B Crystal storage
4Ba Discharge flow path
5 Secondary flow path
6 Control unit
7 Ion removal gas supplier
8 Dissolving agent supplier
9 Gas switching mechanism
10 Opening/closing valve
11 Discharging-side backflow prevention mechanism
12 Return flow path
13 Supply-side backflow prevention mechanism
14 Bypass flow path
15A First valve
15B Second valve
15C Third valve
20 Device
21 Hard water
22 Water tank
22a Bottom surface
22b Water surface
24 Gas supplier
25 First pipe
26 Fine bubble generator
27 Second pipe
28 Pump
30 First water intake section
32 Second water intake section
34 Metal ion concentration detector
40 Fine bubble
42 Crystal
D1 Distance from first water intake section to second water intake section
50 Device
52 Mixed gas supplier
54 Treatment tank
56 First pipe
58 Second pipe
60 Water collection valve
62 Water collector
64 Water storage tank
66 Pump
68 Flow regulation valve
70 Flowmeter
72 Ammonia supply source
74 Nitrogen supply source
76 Mixing ratio regulation valve
78 Supply pipe
80 Fine bubble generator
82 Treated water
84 Crystal
100 Ion removal gas storage
102 Particle feeder
104 Particle feeding mechanism 106 Particle storage
108 First flow path
108A First feeding point
110 Second flow path
110A Second feeding point
112 Third flow path
112A Third feeding point
120 Ion removal gas flow path
122 Dissolving agent flow path
200 Ion removal system
202 Particle feeder (reaction tank)

The invention claimed is:
1. An ion removal system comprising:
an ion removal device including:
  a hard water storage configured to store a hard water; and
  a fine bubble generator configured to generate a fine bubble having a diameter of 100 µm or less to supply the hard water storage with the fine bubble, wherein the fine bubble is configured for removing a metal ion from the hard water by generating an adsorbed metal ion by adsorbing the metal ion in the hard water to the fine bubble in the hard water storage and generating a crystal of metal component by crystallizing and precipitating the adsorbed metal ion;
a separation device connected to the ion removal device via a connection flow path provided at an upper outer peripheral of the hard water storage and configured to separate the crystal precipitated as the metal ion is removed from the hard water by the ion removal device, the separation device including:
  a centrifugal separation section;
  a crystal storage disposed beneath the centrifugal separation section, wherein the crystal storage includes a discharge flow path configured to discharge water containing the precipitated crystal of metal component, the discharge flow path provided with an opening/closing valve capable of opening and closing the discharge flow path; and
a particle feeder that introduces a particle containing a same element as that of the metal ion into the hard water;
further including a flow path connecting the particle feeder and the fine bubble generator, wherein the particle feeder brings the particle into the flow path to provide the fine bubble generator with the particle;
wherein the particle introduced by the particle feeder includes a Group 2 element.

2. The ion removal system according to claim 1,
wherein the metal ion is a calcium ion; and
the particle is calcium carbonate.

3. The ion removal system according to claim 1, comprising:
an ion removal gas supplier configured to supply the fine bubble generator with an ion removal gas as a raw material of the fine bubble generated by the fine bubble generator; and
an ion removal gas flow path connecting the ion removal gas supplier and the fine bubble generator with each other,
wherein the feeding point is located in the ion removal gas flow path.

4. The ion removal system according to claim 1, further comprising a primary flow path for supplying the ion removal device with hard water,
wherein the feeding point is located in the primary flow path.

5. The ion removal system according to claim 1,
wherein the feeding point is located in the hard water storage.

6. The ion removal system according to claim 1,
wherein the particle feeder brings a gel particle.

7. The ion removal system according to claim 2, comprising:
an ion removal gas supplier configured to supply the fine bubble generator with an ion removal gas as a raw material of the fine bubble generated by the fine bubble generator; and
an ion removal gas flow path connecting the ion removal gas supplier and the fine bubble generator with each other,
wherein the feeding point is located in the ion removal gas flow path.

8. The ion removal system according to claim 2, further comprising a primary flow path for supplying the ion removal device with the hard water, wherein the feeding point is located in the primary flow path.

9. The ion removal system according to claim 2,
wherein the feeding point is located in the hard water storage.

10. The ion removal system according to claim 2
wherein the particle feeder brings a gel particle.

11. The ion removal system according to claim 3, wherein the ion removal gas is selected from nitrogen, ammonia, and combinations thereof.

12. The ion removal system of claim 1, wherein the flow path directly connects the particle feeder and the fine bubble generator.

* * * * *